(12) United States Patent
Rawdon et al.

(10) Patent No.: US 7,891,608 B2
(45) Date of Patent: Feb. 22, 2011

(54) SPACE FRAME FUSELAGE STRUCTURE AND RELATED METHODS

(75) Inventors: Blaine K. Rawdon, San Pedro, CA (US); Robert E. Grip, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 763 days.

(21) Appl. No.: 11/743,929

(22) Filed: May 3, 2007

(65) Prior Publication Data
US 2008/0272236 A1    Nov. 6, 2008

(51) Int. Cl.
*B64C 1/00* (2006.01)
(52) U.S. Cl. .................. 244/119; 244/118.1; 244/137.1; 244/137.3
(58) Field of Classification Search .............. 244/118.1, 244/119, 137.1, 137.3, 4 A
See application file for complete search history.

(56) References Cited

U.S. PATENT DOCUMENTS

| | | | | |
|---|---|---|---|---|
| 2,149,844 | A * | 3/1939 | George | 403/178 |
| 2,442,459 | A * | 6/1948 | Fowler | 244/118.2 |
| 2,973,923 | A | 3/1961 | Sznycer | |
| 4,161,301 | A * | 7/1979 | Beardsley et al. | 244/137.3 |
| 4,256,012 | A * | 3/1981 | Cowart et al. | 89/1.816 |
| 4,648,570 | A * | 3/1987 | Abdelmaseh et al. | 244/118.1 |
| 5,106,038 | A * | 4/1992 | Dupont | 244/137.1 |
| 6,547,181 | B1 | 4/2003 | Hoisington et al. | |
| 6,722,610 | B1 | 4/2004 | Rawdon et al. | |
| 6,848,650 | B2 * | 2/2005 | Hoisignton et al. | 244/13 |
| 7,095,364 | B1 | 8/2006 | Rawdon et al. | |
| 2006/0108477 | A1* | 5/2006 | Helou | 244/137.1 |

FOREIGN PATENT DOCUMENTS

| | | |
|---|---|---|
| GB | 0124819 A | 4/1919 |
| GB | 0366965 A | 2/1932 |
| WO | WO 98/46471 A1 | 10/1998 |

OTHER PUBLICATIONS

Pilot Press Copyright Drawing, publication date unknown.

* cited by examiner

*Primary Examiner*—Timothy D Collins
*Assistant Examiner*—Justin Benedik
(74) *Attorney, Agent, or Firm*—Harness, Dickey & Pierce, P.L.C.

(57) ABSTRACT

An aircraft for carrying cargo in one or more containers. The aircraft includes a fuselage structure having a plurality of nodes and a plurality of elements connecting the nodes to form a space frame in which to carry cargo. At least some of the nodes are positioned in the space frame based on dimensions of the one or more containers. The fuselage structure is more compact, lighter and less expensive compared to conventional semi-monocoque fuselages.

12 Claims, 23 Drawing Sheets

SPACE FRAME FUSELAGE STRUCTURE AND RELATED METHODS

FIELD

The present disclosure relates generally to transportation of cargo by aircraft and, more particularly, to fuselage structures in cargo aircraft.

BACKGROUND

The statements in this section merely provide background information related to the present disclosure and may not constitute prior art.

When cargo is transported via aircraft, small, specialized pallets and/or cargo containers are generally used in loading the cargo, supporting the cargo during flight, and unloading the cargo at its destination. Many if not most of these pallets and/or containers are used only for air transport and are not used in connection with other modes of cargo transport. The cost of transferring cargo between surface transport modes (truck, trains, etc.) and the foregoing aircraft pallets and containers can add substantially to the total cost of transport.

Generally, when aircraft pallets and containers are loaded into an aircraft fuselage, the fuselage structure must support each pallet at small, approximately regular intervals across the length and breadth of its underside. In addition to providing support, existing cargo airplane fuselage structures need to provide structural stability. Most aircraft fuselage structures of the commonly-used "semi-monocoque" type have a skin forming the outer surface of the aircraft. Stringers and frames are typically added to stabilize the skin. Also, the skin itself typically is thickened, or stiffened, to avoid buckling under some load conditions. Adding stabilizing elements and/or stiffeners, however, adds weight to a fuselage structure and is expensive and time-consuming.

SUMMARY

In one implementation, the present disclosure is directed to an aircraft for carrying cargo in one or more containers. The aircraft includes a fuselage structure having a plurality of nodes and a plurality of elements connecting the nodes to form a space frame in which to carry cargo. At least some of the nodes are positioned in the space frame based on dimensions of the one or more containers.

In another implementation, a method of making an aircraft for transporting cargo in one or more containers includes connecting a plurality of trusses at a plurality of nodes to provide a space frame. At least some of the nodes are positioned in the space frame based on dimensions of the one or more containers. The space frame is included in a fuselage of the aircraft.

In another implementation, an aircraft includes a fuselage structure having a plurality of elements and a plurality of nodes at which the elements are connected to form a space frame. A wing is connected with the fuselage structure via at least some of the nodes of the space frame. A plurality of links movably connect the wing with the at least some of the nodes.

In still another implementation, the disclosure is directed to a method of loading and/or unloading containerized cargo relative to an aircraft. The method includes moving one or more containers of the cargo into a space frame of a fuselage of the aircraft, and fastening a plurality of corners of the one or more containers to a plurality of nodes of the space frame.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE PREFERRED EMBODIMENTS

Figure 1:
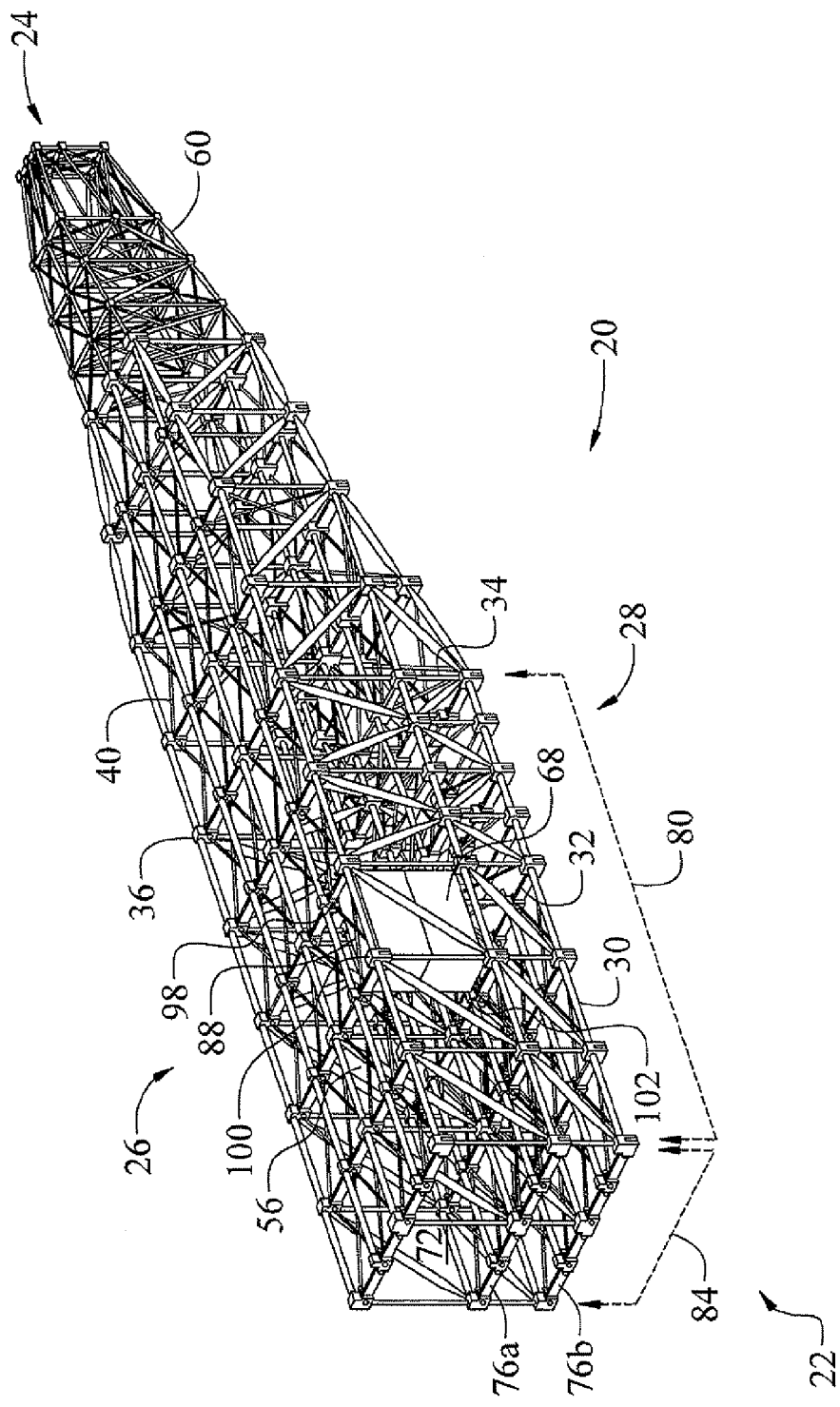
FIG. 1 is a perspective view of an aircraft fuselage space frame in accordance with one implementation of the disclosure, the view taken from the left side of the space frame.

The following description is merely exemplary in nature and is not intended to limit the present disclosure, application, or uses.

The present disclosure, in various implementations, is directed to an aircraft for carrying cargo in one or more containers. A fuselage structure of the aircraft includes a plurality of nodes and a plurality of elements connecting the nodes to form a space frame in which to carry cargo. At least some of the nodes are positioned in the space frame based on dimensions of the container(s). More specifically, and as further described below, at least some of the nodes may be generally located for attachment with corners of ISO containers. It should be noted, however, that although implementations are described with reference to ISO containers and/or with reference to containers having specific dimensions, the disclosure is not so limited. The disclosure may be implemented in relation to many different types and/or sizes of containers.

In various configurations of the disclosure, a fuselage structure may accommodate inter-modal containers conforming to ISO specification 1496. ISO specification 1496 describes a family of inter-modal containers. The inventors have observed that containers conforming to the foregoing specification have been commonly accepted throughout the world for surface vehicle use, e.g., to transport cargo on large ships, trucks and trains. A related specification, 8323, describes an air-compatible, lightweight container. Collectively, the foregoing containers may be referred to as "ISO containers".

An ISO container is equipped with a standard attachment fitting at each of its eight corners. Typically, external loads imposed on the container from transport and handling are imposed on the corner fittings. The container does not need to be supported along its bottom surface. Indeed, the bottoms of most ISO containers are not flat and are not intended to accept external loads. ISO containers are configured to be supported and restrained only at the corner fittings. Accordingly, various configurations of cargo aircraft in accordance with the disclosure include fittings that engage the containers' corners.

The ISO container family includes containers of different lengths and/or heights. The widths of the containers are the same, e.g., eight feet. It has been observed that the most popular lengths may be 40 feet and 20 feet. The ISO specification permits two 20-foot containers to fit in the same length as a 40-foot container. Accordingly, in some aircraft configurations and as further described below, fittings are provided and spaced to accommodate a full load of 20-foot containers. The same fittings, or a subset of the same fittings, would also accommodate 40-foot containers.

Compared with typically diffuse loads imposed on a conventional cargo aircraft floor by small, flat-bottomed pallets, an ISO container restrained at its corners would typically impose heavy, concentrated loads on the fittings and structure of an aircraft carrying the container. These loads could be compounded if containers were stacked. Use of 40-foot containers can further concentrate such loads, since the total weight of a 40-foot container would be about twice that of a comparably loaded 20-foot container with the same type of corner fittings.

Figure 2:
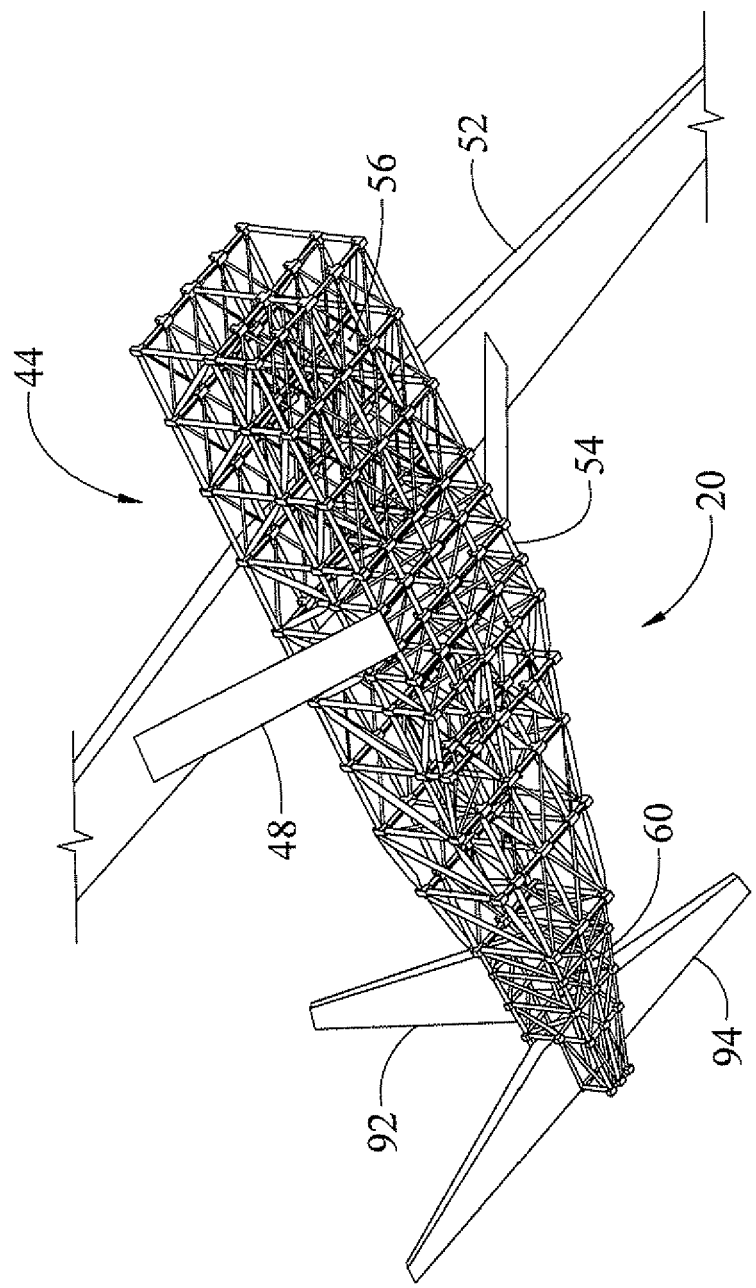
FIG. 2 is a perspective view of portions of an aircraft having a fuselage structure in accordance with one implementation of the disclosure, the view taken from beneath and to the right of the aircraft.

One implementation of a fuselage space frame is indicated generally in FIGS. 1 and 2 by reference number 20. The space frame 20 has a front, rear, and right and left sides indicated generally by reference numbers 22, 24, 26 and 28 respectively. The space frame 20 includes a plurality of longitudinal elements 30, lateral elements 32 and vertical elements 34 joined at a plurality of nodes 36. A plurality of diagonal elements 40 are connected between some of the nodes 36. The space frame fuselage structure 20 is included in an aircraft 44, parts of which are shown schematically in FIG. 2. External struts 48 may optionally be used to link wings 52 of the aircraft 44 with a portion 54 of the fuselage in the vicinity of landing gear (not shown). The terms "wing" and "wings" may be used interchangeably. Other portions of the space frame 20 include a cargo hold 56 and an aft fuselage portion 60.

The cargo hold 56 is configured to hold one or more cargo containers 68 in one or more generally rectangular bays 72 defined by one or more decks 76, a plurality of longitudinal columns 80, and a plurality of transverse rows 84. For example, as shown in FIG. 1, a two-high stack or block 88 of 20-foot long ISO containers are in the left-most column 80 in the third 20-foot long row 84 of a deck 76a of the frame. It should be noted that a space frame may have columns of different lengths. For example, as shown in FIG. 1, the space frame 20 has four columns 80: two outer columns and two center columns 80 which are longer than the outer columns 80 by the length of two bays 72.

It also should be noted that the term "deck" does not necessarily denote the presence of a "floor" on which one may walk. In the present embodiment the decks 76 do not include floor surfaces (except, e.g., for such surface areas as may be provided by longitudinal and lateral elements 30 and 32.) Rather, "deck" refers to a level of the aircraft 44 that supports the cargo containers 68 from below. Thus, e.g., in the aircraft 44, the deck 76a is an upper deck on which the containers 68 are supported above a lower deck 76b. The space frame 20 is open at the front end 22 to permit full-width loading of the cargo hold 56 as further described below. It should be noted that the open nature of the space frame structure 20 allows it to be non-pressurized during flight.

The space frame 20 also may support landing gear (not shown in FIG. 1 or 2), wing struts 48, and vertical and horizontal tails 92 and 94. In the cargo hold 56, the nodes 36 are configured to connect to corner fittings 98 on 20-foot long containers. It should be noted that nodes 36 may connect to different numbers of container corner fittings 98 depending on the nodes' locations in the space frame 20. For example, a node 36 at an outside corner 100 of the container block 88 may be connected with corner fittings 98 of up to two containers 68. A node 36 essentially in the middle of the upper deck 76a, e.g., a node 102 connected to the block 88, could be connected to as many as eight different containers 68: up to four containers on the upper deck 76a, and up to four containers on the lower deck 76b. If 40-foot long containers were used instead of 20-foot long containers for a given flight, some of the nodes 36 (e.g., approximately half) would not be connected to the containers. Referring again to the container arrangement shown in FIG. 1, the two-high container stack 88 is connected to the space frame 20 only at the bottom four fittings 98 of the bottom container 68 and the top four fittings 98 of the top container 68. The two containers are stacked one atop the other and secured to each other as known in the art, e.g., by twist locks (not shown).

The ISO containers 68 may be arranged so as to provide aerodynamic and structural balance, resulting, e.g., in a general form similar to that of many, if not most, airplane fuselages. In the embodiment shown in FIG. 1, containers 68 may be arranged on the upper and lower decks 76. On the upper deck 76a, containers may be positioned in parallel four-wide and may be stacked two-high. The length of the two central longitudinal columns 80 is essentially equal to the length of nine 20-foot long containers 68. The length of the two outer longitudinal columns 80 is essentially equal to the length of seven 20-foot long containers 68. On the lower deck 76b, 20-foot long containers 68 may be positioned one-high by four-wide by three-long. Containers on the lower deck 76b would be located under the three most forward rows 84 of containers on the upper deck 76a.

It should be noted that numerous other container types, stacking arrangements, numbers of decks, numbers of bays for holding containers and arrangements of other or additional types of containers are feasible and contemplated. For example, the disclosure could be implemented in connection with a flying wing and/or a blended-wing-body. In such implementations, containers might extend primarily in a span-wise direction rather than along a longitudinal axis.

Figure 3:
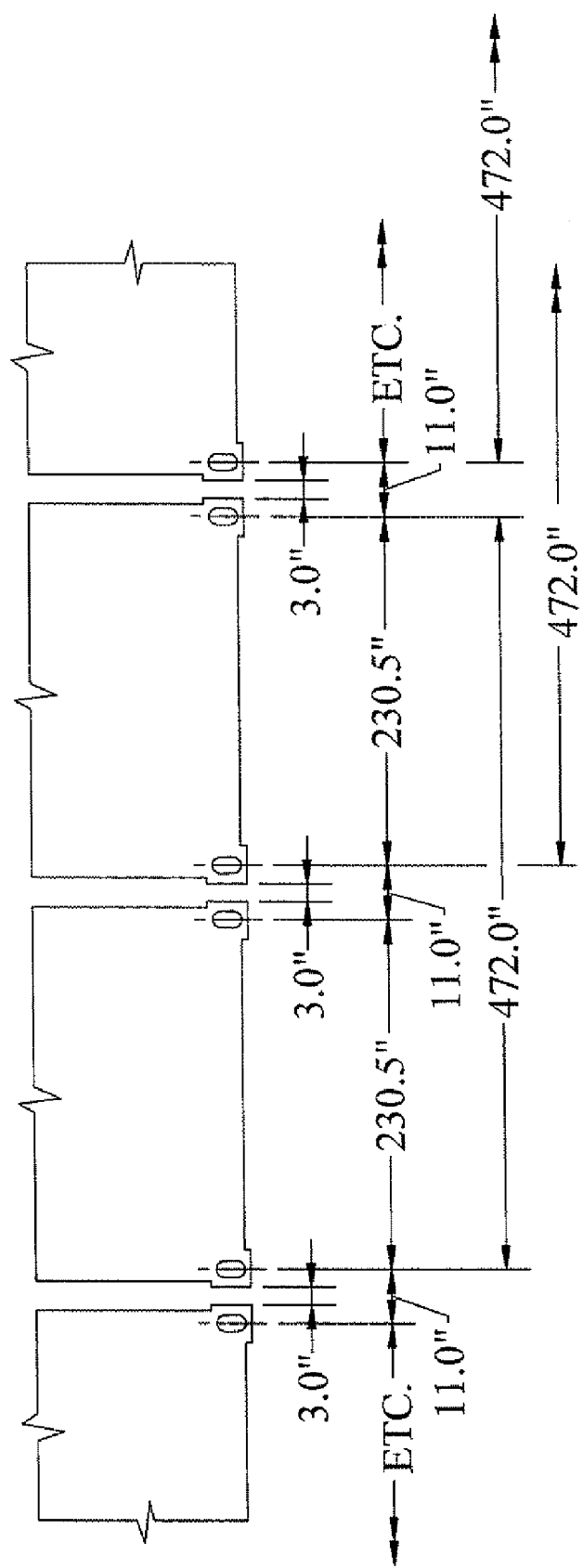
FIG. 3 is a side view of longitudinal spacing of container fittings in accordance with one implementation of the disclosure.

As previously discussed, ISO containers are specified such that (a) two 20-foot containers may fit in the same space as a single 40-foot container and (b) a 40-foot container may fit at any incremental 20-foot position along a column of 20-foot connections. Accordingly, container corner fittings 98 may be spaced as described in FIG. 3. Although a 40-foot ISO container is 40 feet long (480.0 inches), a 20-foot ISO container is slightly shortened to 238.5 inches. These dimensions result in a clearance of 3.0 inches between containers. Nodes 36 of the space frame 20 used for securing cargo containers thus may be spaced, e.g., as illustrated in FIG. 3, so as to accept 20 and 40-ft containers with the same restraint fittings as further described below.

It can generally be desirable for loads placed on elements of a space frame to be at least substantially tension and/or compression loads and for bending loads on the elements to be minimal or non-existent. In such manner, a constant distribution of stress might be promoted along the length and across the cross section of an element. Thus an element might be highly loaded while overloading of any portion of the element would be minimal or non-existent. Additionally, a purely axial load on a compression element would increase a minimum force at which the element would buckle. In practice, however, it is difficult to achieve pure axial loads on space frame elements, since all loads imposed at nodes of a space frame would need to be symmetrical about the axes of the space frame elements. This is typically impractical if not impossible.

In various configurations of the present disclosure, when non-aligned or asymmetrical loads are imposed on space frame nodes, some space frame elements may oppose such loads with bending moment. Thus, in the present exemplary embodiment, the longitudinal, lateral and vertical elements 30, 32 and 34 of the space frame 20 generally have moment connections to the nodes 36. That is, rotation of a node 36 about its longitudinal axis may be controlled by the bending rigidity of lateral and vertical elements 32 and 34. Rotation about the node's lateral axis may be resisted by bending rigidity of longitudinal and vertical elements 30 and 34. Rotation about the node's vertical axis may be resisted by bending rigidity of lateral and longitudinal elements 32 and 30.

Figure 4:
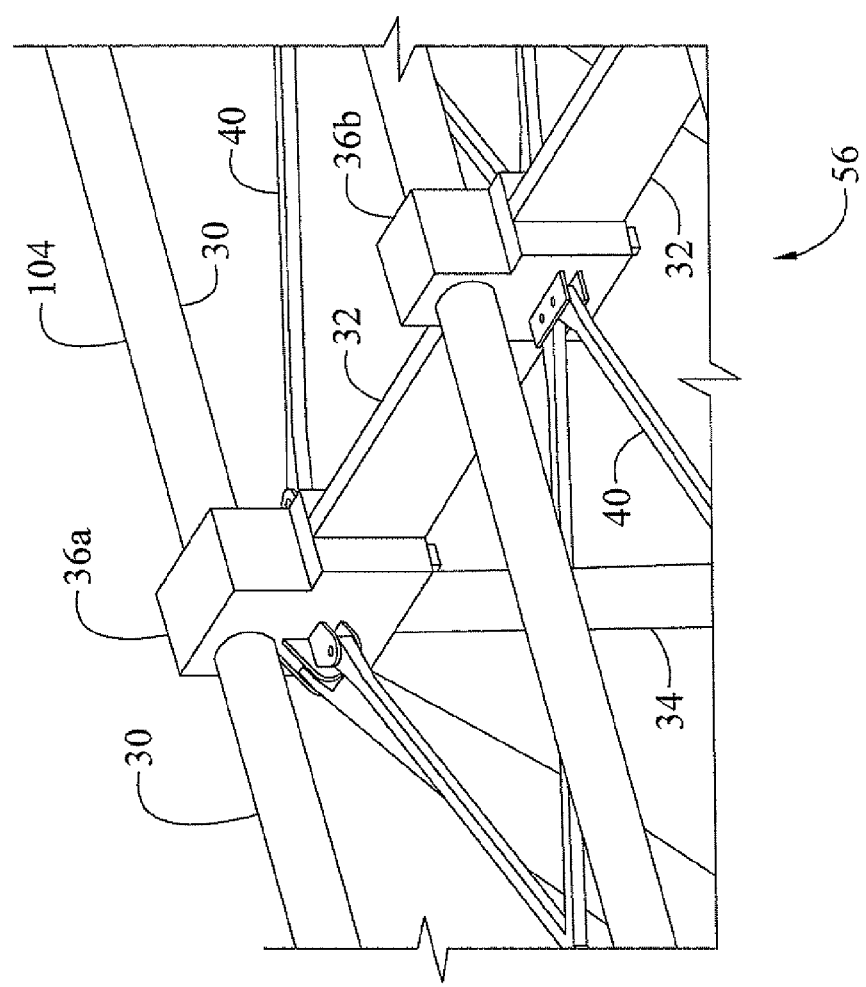
FIG. 4 is a partial perspective view of an upper right edge of a cargo hold portion of a fuselage structure in accordance with one implementation of the disclosure.

Two nodes 36a and 36b are shown in FIG. 4. The node 36a is located on an upper right edge 104 of the cargo hold 56 of the fuselage. Generally, longitudinal elements 30 span between nodes 36. Longitudinal elements 30 generally are connected so as to help prevent rotation of a node 36 about its lateral and vertical axes. The form of a longitudinal element 30 may be a cylindrical tube, e.g., that may be plugged over a cylindrical tube extension (not visible in FIG. 4) of a node 36. Specifically and for example, an extension of a node 36 may be fitted into an inside diameter of a longitudinal element 30.

In some implementations, one or more vertical and/or longitudinal elements may be at least partially solid.

Vertical elements 34 typically span between nodes 36. Vertical elements 34 generally are connected to help prevent rotation of a node 36 about its longitudinal and lateral axes. The form of a vertical element 34 may be a cylindrical tube, e.g., that may be plugged over a cylindrical tube extension (not visible in FIG. 4) of a node 36. Specifically and for example, an extension of a node 36 may be fitted into an inside diameter of a vertical element 34. Lateral elements 32 generally span between nodes 36. Lateral elements 32 generally are connected to help prevent rotation of a node 36 about its longitudinal and vertical axes. A lateral element 32 generally may be plugged into a cavity (not visible in FIG. 4) provided in a node 36.

Figure 5:
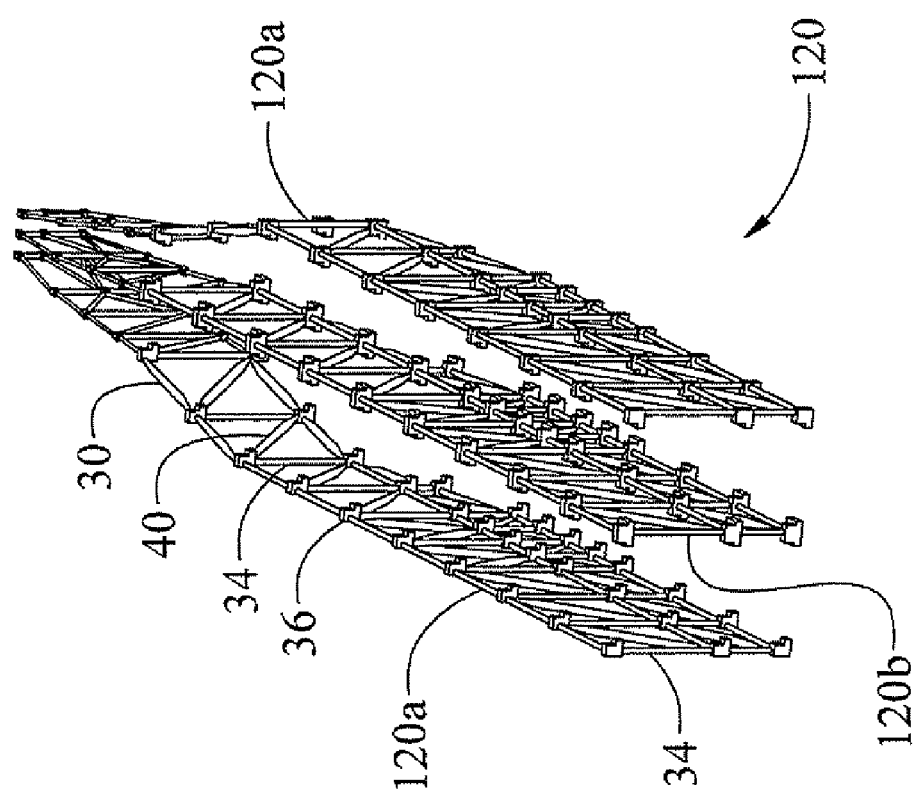
FIG. 5 is a perspective view of load-carrying vertical-longitudinal trusses in accordance with one implementation of the disclosure, the view taken from in front of the trusses.
Figure 6:
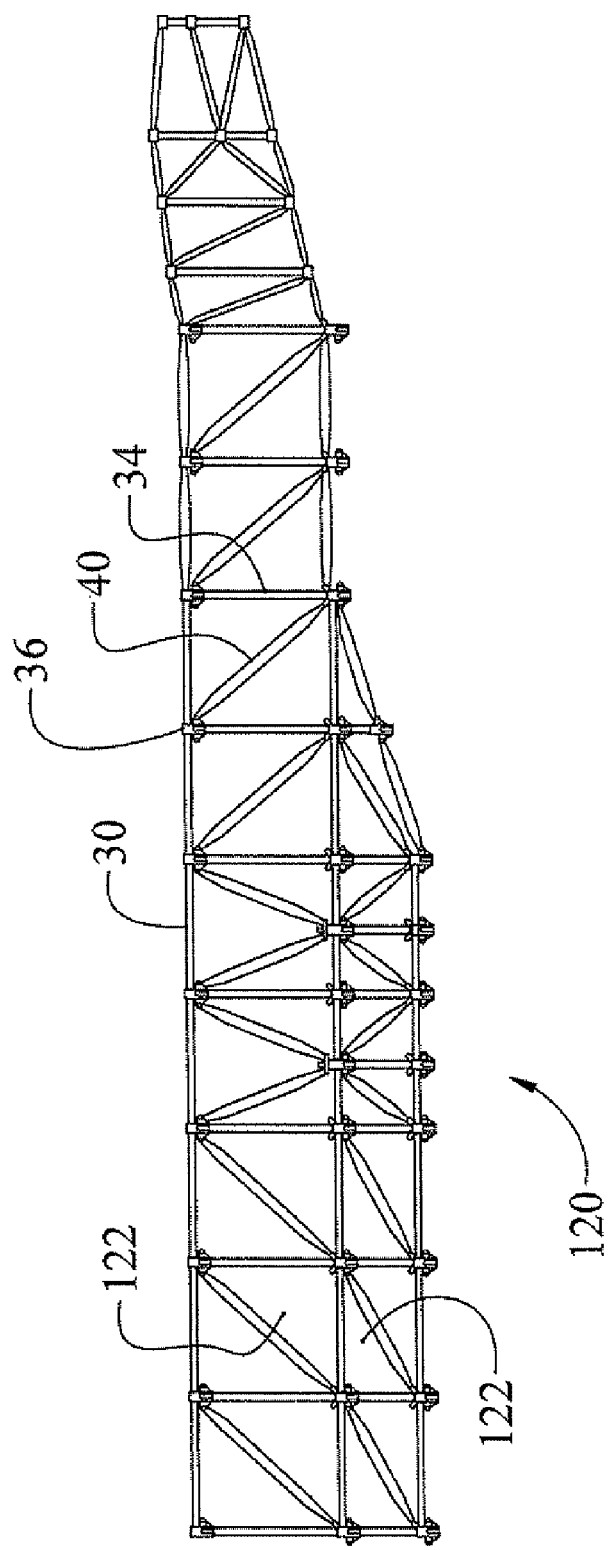
FIG. 6 is a left side view of the load-carrying vertical-longitudinal trusses shown in FIG. 5.

The form of a lateral element 32 may be a rectangular section tube, an I-beam or some other form that efficiently resists bending in a vertical axis of the lateral element. It should be noted, however, that although using a lateral element having a cross section that resists bending may be appropriate where the lateral elements 32 are placed in bending, the disclosure is not so limited. Where, for example, a fuselage has two or three columns for cargo and three or four longitudinal-vertical trusses respectively making up the sides and center webs, then cargo containers would be supported at nodes that are supported by a full lateral-longitudinal truss. Accordingly, the lateral elements 32 would not need to beam the loads laterally. Thus the lateral elements 32 would not be in significant bending, and so the elements 32 would not need to be shaped in a form that efficiently resists bending. In such embodiments, a lateral element 32 may be, e.g., circular in cross section.

Where (as in the present exemplary embodiment) it is desired to accommodate four columns 80 of containers, five vertical-longitudinal planes of nodes and elements may be provided. In the vicinity of the bays 72 for holding containers, two types of vertical-longitudinal planes may be provided. Three exemplary load-carrying vertical-longitudinal trusses included in the space frame 20 are indicated generally in FIGS. 5-7 by reference number 120. The load-carrying vertical-longitudinal trusses 120 carry vertical load and include two outboard trusses 120a and a center truss 120b. The three trusses 120 include diagonal elements 40. As shown in FIGS. 5-6, the diagonal elements 40 are rigid and operate in tension or compression according to the direction of loading. The diagonal elements 40 are connected to the nodes 36 via connectors that do not transfer moment. Such connectors may include but are not limited to pin joints and/or bolt connections. Instead of a single rigid diagonal element 40, two diagonal tension-only elements 40 could be used that form an "X" within rectangular cells 122 formed by the vertical and longitudinal elements 34 and 30. A tension-only element need not resist buckling and could have a small, solid cross section.

Figure 8:
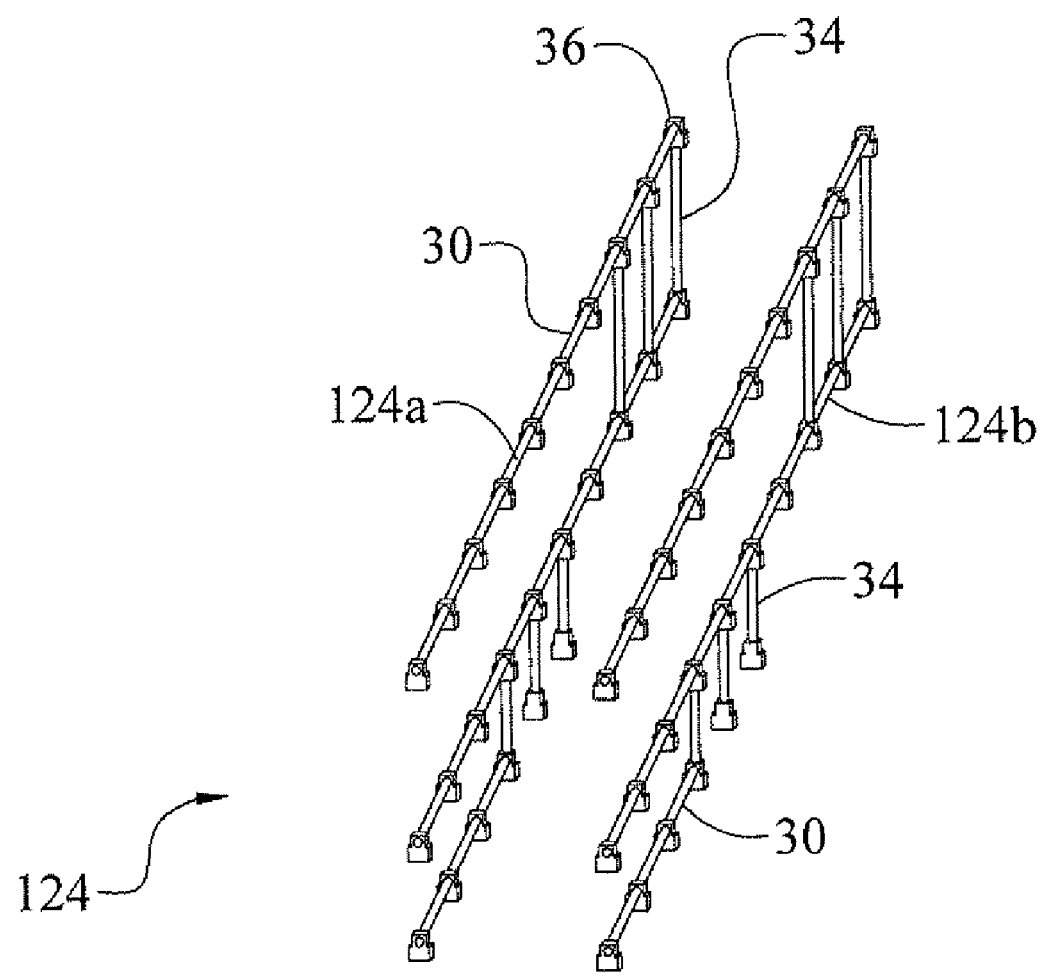
FIG. 8 is a perspective view of vertical-longitudinal planes in accordance with one implementation of the disclosure, the view taken from in front of the planes.
Figure 9:
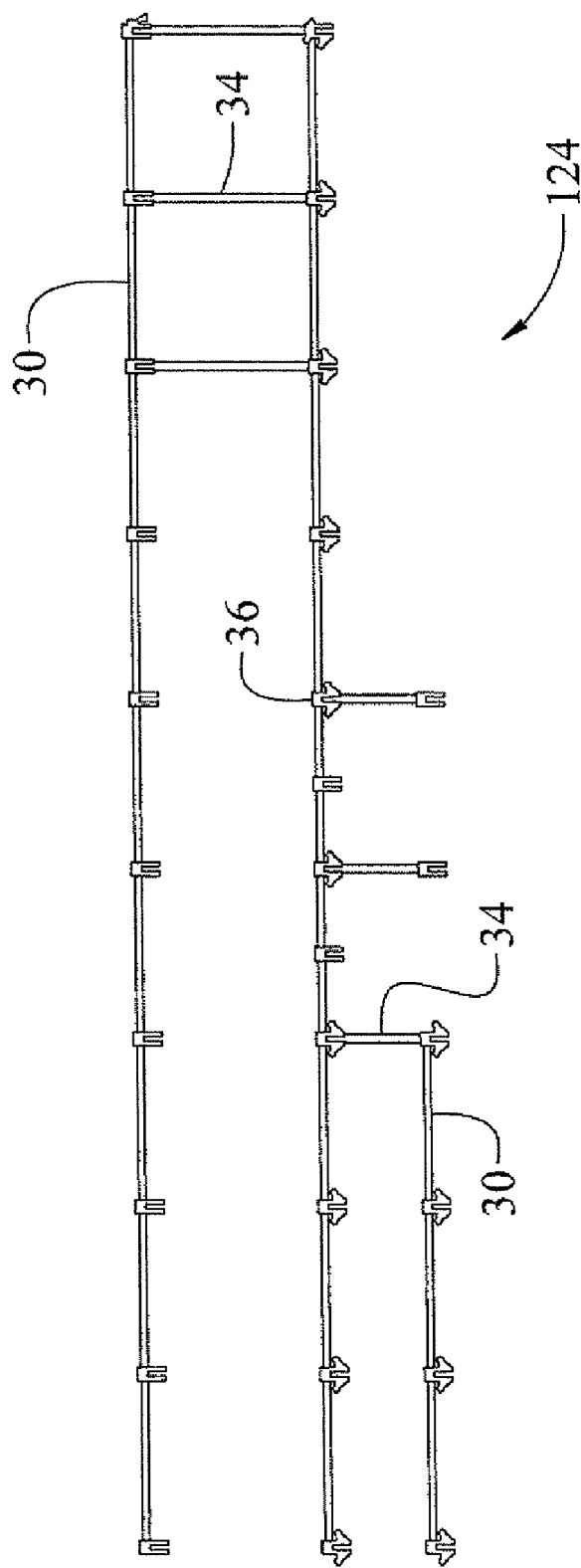
FIG. 9 is a left side view of the vertical-longitudinal planes shown in FIG. 5.

Two vertical-longitudinal planes that are at least substantially non-load-carrying are indicated generally in FIGS. 8-9 by reference number 124. The terms "plane" and "truss" may be used interchangeably in this disclosure and the claims. "Plane" may be used in some instances to refer to a truss structure that includes elements 30, 32 and/or 34 and that has a generally non-curved profile. The two vertical-longitudinal planes 124a and 124b include nodes 36, longitudinal elements 30 and several vertical elements 34 outside the container bays 72. Vertical elements 34 may be located in the vicinity of landing gear and in the portion of the cargo hold 56 in which the two center columns 80 extend beyond the outboard columns 80.

Figure 10:
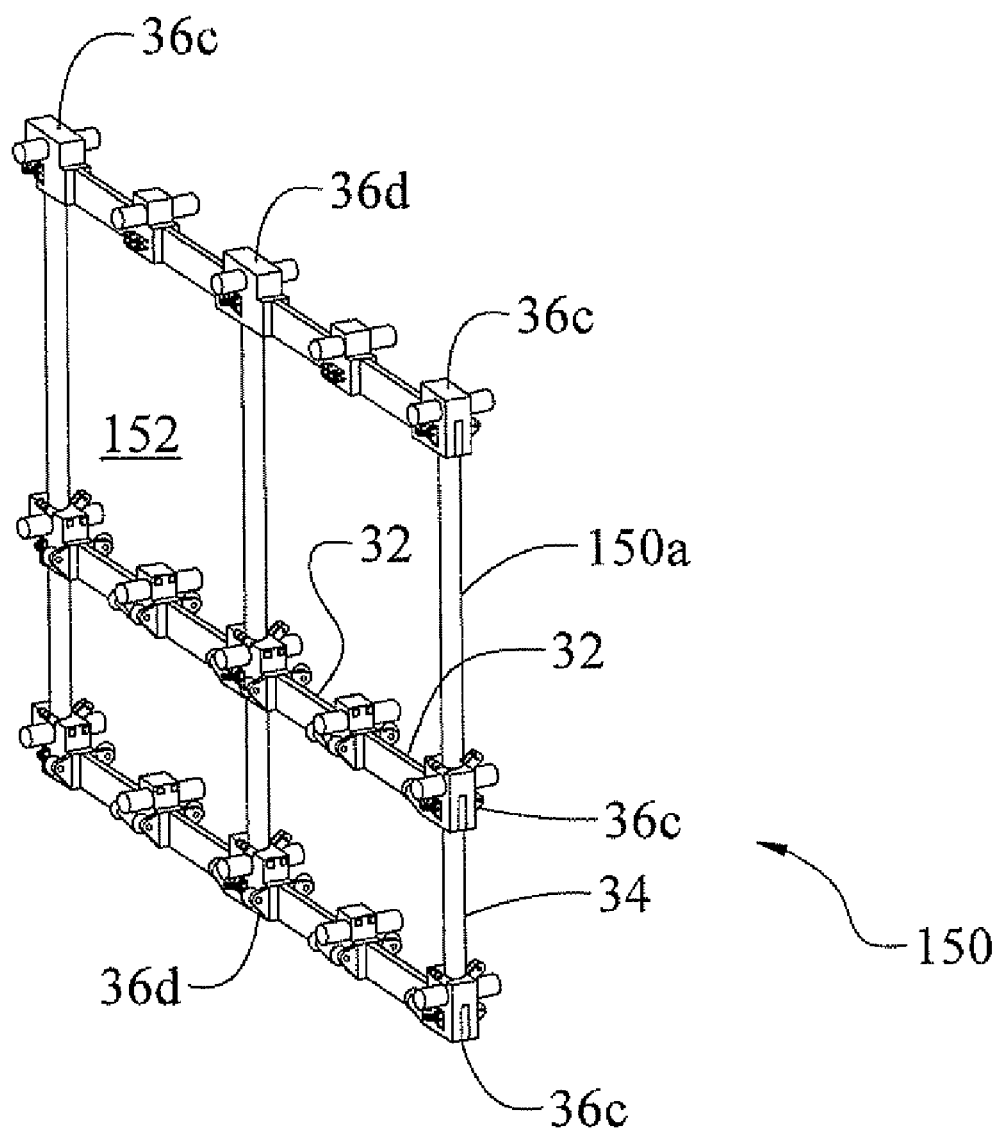
FIG. 10 is a perspective view of a vertical-lateral plane in accordance with one implementation of the disclosure, the view taken from the front and left of the plane.
Figure 11:
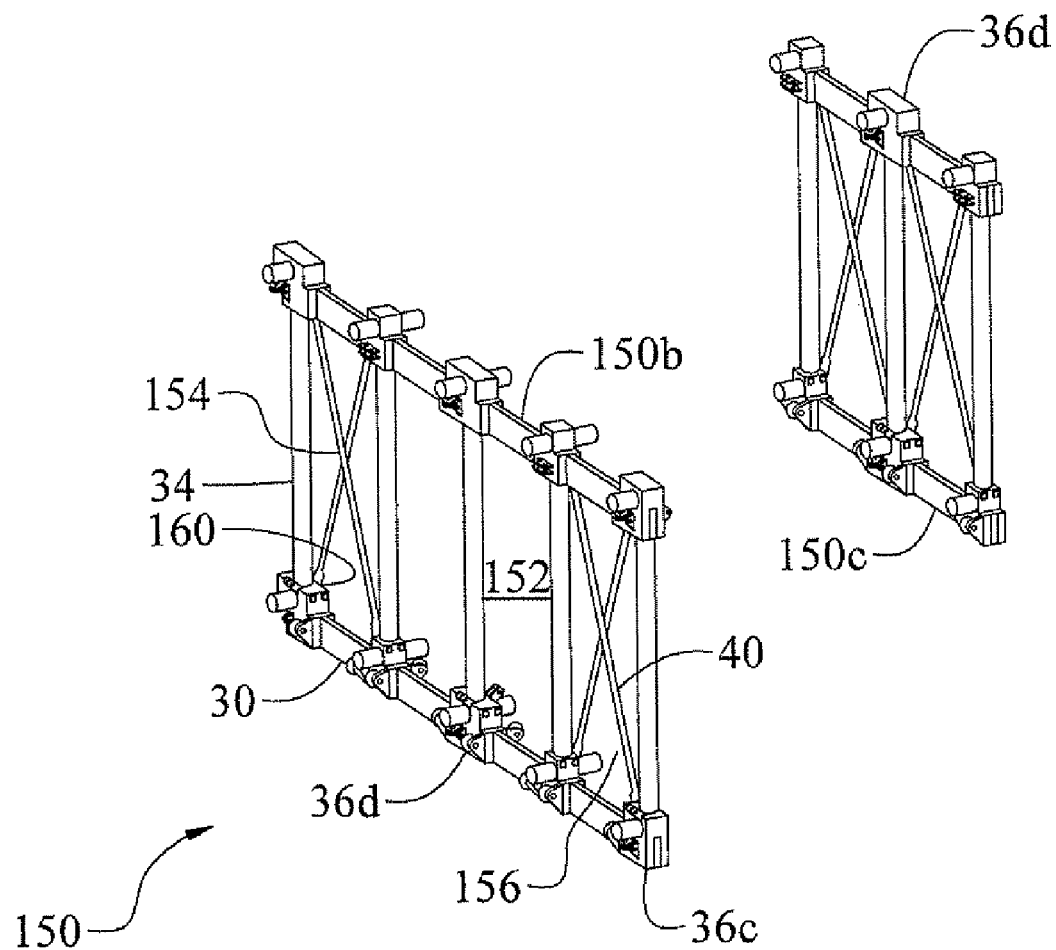
FIG. 11 is a perspective view of vertical-lateral planes in accordance with one implementation of the disclosure, the view taken from the front and left of the planes.

Vertical-lateral planes of the space frame 20 are indicated generally in FIGS. 10-11 by reference number 150. Where (as in the present exemplary embodiment) it is desired to accommodate nine rows of 20-foot containers, ten or more lateral-vertical planes of nodes and elements may be provided. Vertical-lateral planes 150a (shown in FIG. 10) are formed by nodes 36, vertical elements 34 and lateral elements 32. Vertical-lateral planes 150a are provided in the cargo hold 56. Vertical elements 34 may be connected between outboard nodes 36c and between center nodes 36d, leaving spaces 152 in the planes 150a for containers. One or more vertical-lateral planes 150b (shown in FIG. 11) may be located at or near the end of the outboard columns 80 of the cargo hold 56. The vertical-lateral plane(s) 150b include central container spaces 152 and pairs 154 of diagonal elements 40 spanning outboard spaces 156. At least one vertical-lateral plane 150c is located in or near the aft portion 60, e.g., at or near the end of the central columns 80 of the cargo hold 56. In the trusses 150b and 150c, diagonal tension elements 40 connect diagonally opposed nodes 36. The diagonal elements 40 are attached, e.g., by connectors 160 that do not transfer moment. Such connectors may include but are not limited to pin joints and/or bolt connections. In some configurations, at least some of the pairs of diagonal tension elements 40a could be replaced by single tension-compression diagonal elements.

Where (as in the present exemplary embodiment) it is desired to provide two cargo decks 76, three horizontal trusses of nodes and elements may be provided. A horizontal truss is indicated generally in FIG. 12 by reference number 200. The horizontal truss 200 shown in FIG. 12 contributes to the upper deck 176a of the space frame 20 and extends beyond the cargo hold 56 to the lower aft fuselage 60. Horizontal trusses 200 include nodes 36, longitudinal elements 30, and lateral elements 32. Diagonal, tension-only elements 40 link a plurality of the nodes 36 and diagonally cross substantially rectangular spaces 208 formed by longitudinal and lateral elements 30 and 32. The diagonal elements 40 are connected to the nodes 36 by connectors 212 that do not transfer moment. Such connectors may include but are not limited to pin joints and/or bolt connections.

Figure 13:
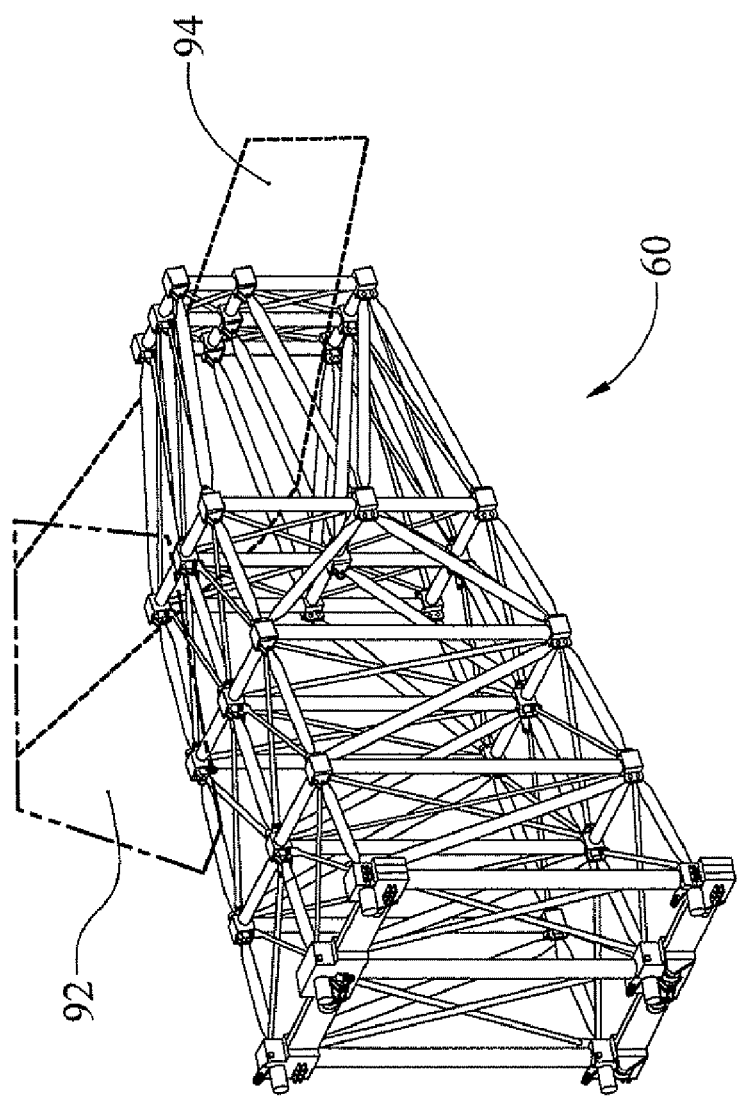
FIG. 13 is a perspective view of an aft fuselage structure in accordance with one implementation of the disclosure, the view taken from the front and left of the structure.
Figure 14:
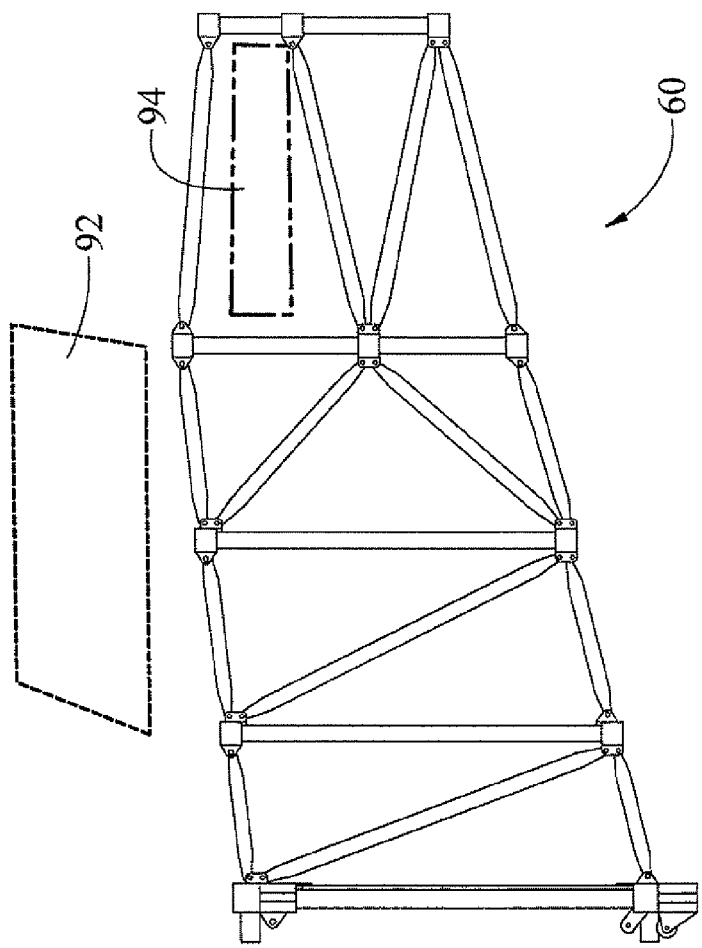
FIG. 14 is a left side view of the aft fuselage structure shown in FIG. 14.
Figure 15:
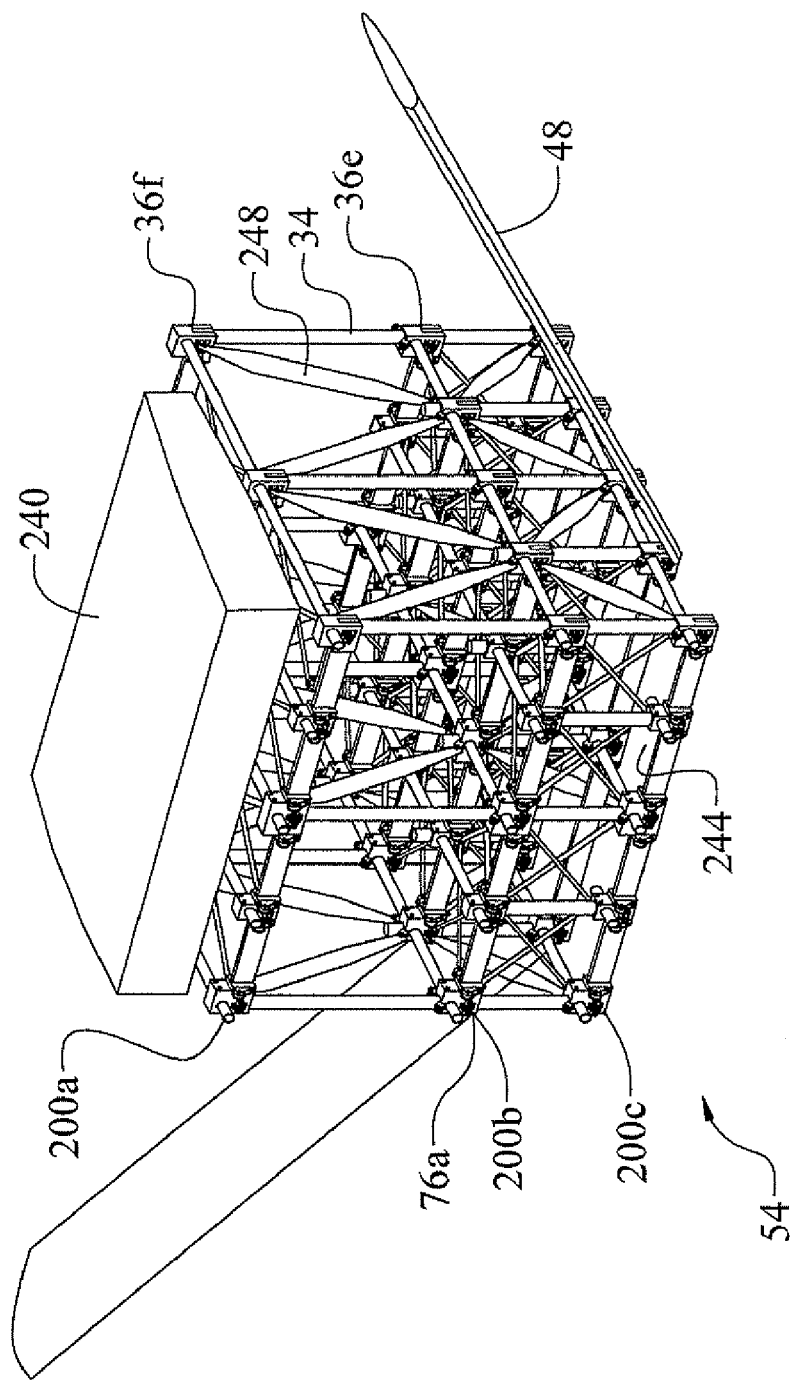
FIG. 15 is a perspective view of a fuselage structure near a wing, wing strut and landing gear in accordance with one implementation of the disclosure, the view taken from the front and left of the structure.

In portions of the space frame 20 outside the cargo hold 56, e.g., in the aft fuselage structure 60 and fuselage structure 54 near wings 52, wing struts 48 and landing gear, nodes 36 may be included that are different from those in the cargo hold 56. In the fuselage structure 54, nodes 36 may be connected to the landing gear. Aft of the cargo hold 56, nodes 36 may be simpler and lateral elements 32 may be tubular to save weight. The aft fuselage structure 60 is shown in greater detail in FIGS. 13-14.

Fuselage structure 54 in the area of the wings 52, wing struts 48 and landing gear is shown in FIGS. 15-21. Three horizontal trusses are indicated by reference numbers 200a-200c. Wings 52 are represented in FIGS. 15-20 by a center wing box 240. In the fuselage structure 54, a standard approximately 20-foot module length may be reduced, e.g., divided in half, to provide appropriately sized bays 244 for landing gear (not shown). Landing gear bays 244 may be provided as rectangular bays below the upper deck 76. Vertical elements 34 and diagonal bracing 248 connect landing gear bay nodes 36e to upper nodes 36f of the fuselage structure.

Figure 16:
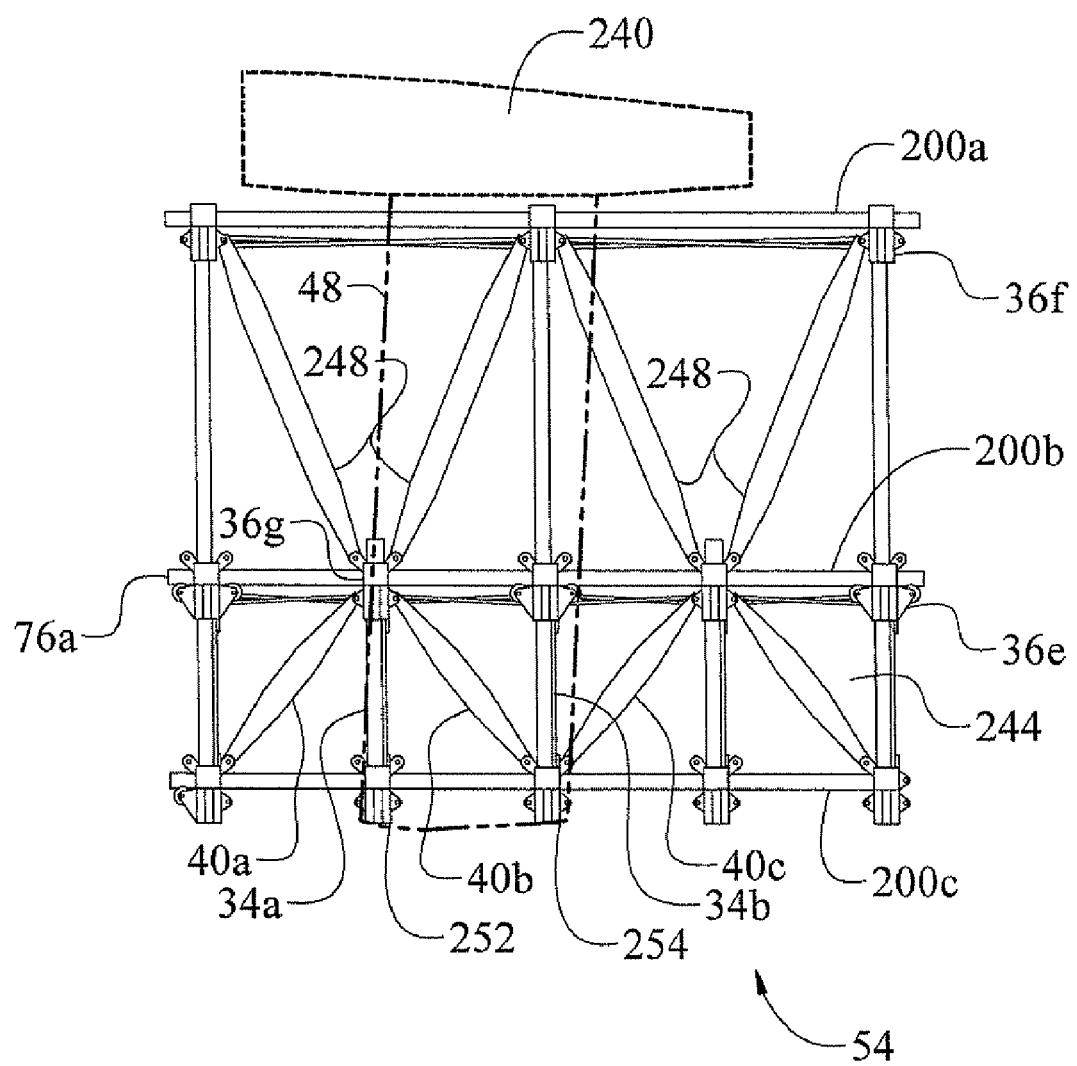
FIG. 16 is a left side view of the fuselage structure shown in FIG. 15.
Figure 21:
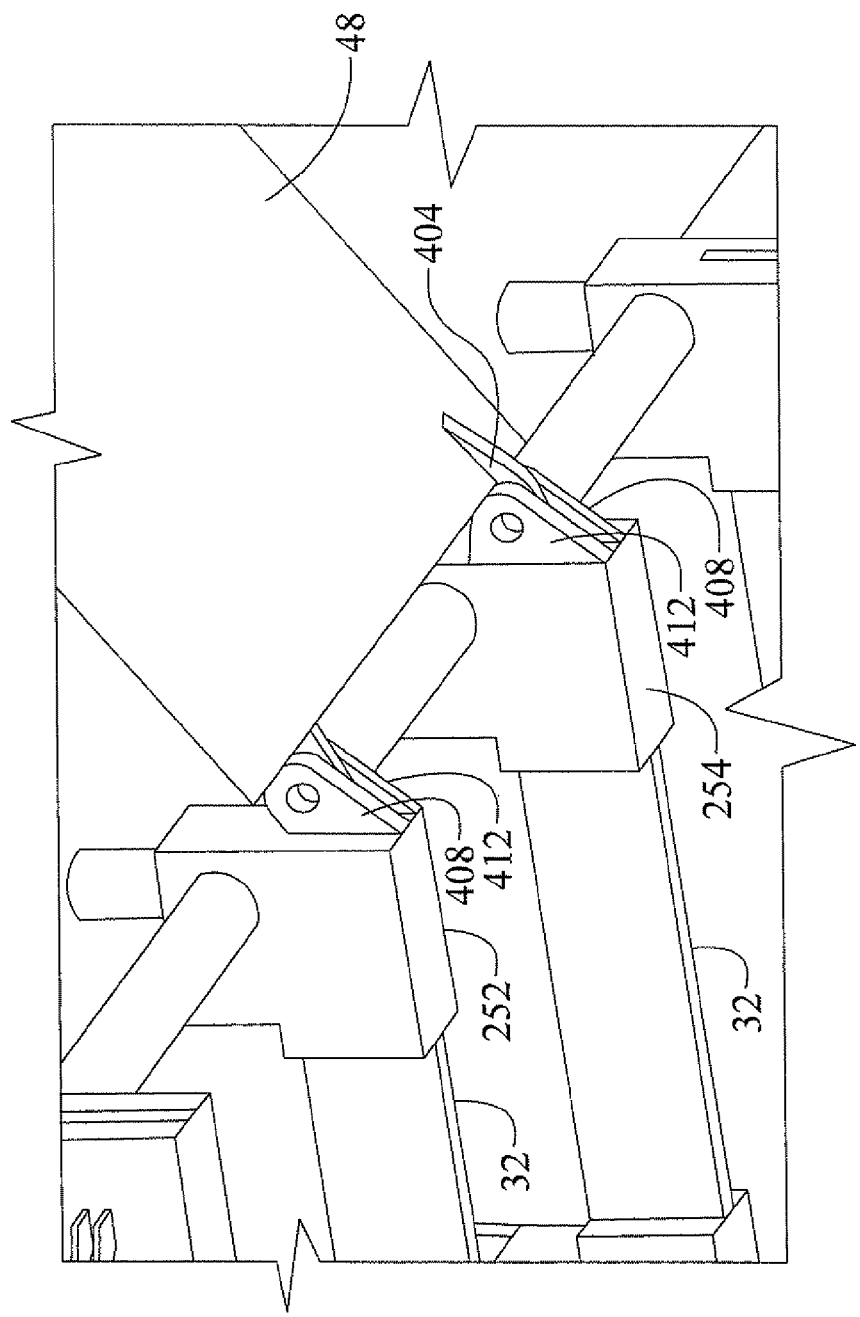
FIG. 21 is a perspective view of a left-side wing strut-to-fuselage connection in accordance with one implementation of the disclosure, the view taken looking up from in front, below and to the left of the aircraft.

Loads of wing struts 48 may be carried through to the fuselage structure 54 as shown in FIGS. 16 and 21. Such loads may be taken, e.g., by lateral elements 32 in the bottom horizontal truss 200c at forward and aft nodes 252 and 254 connecting a strut 48 and the fuselage frame 54. Vertical elements 34 and diagonal elements 40 also meet the node connections 252 and 254 between the strut 48 and fuselage frame 54. Specifically, a vertical element 34a extends from the forward node 252 to a node 36g in the upper deck 76a. The vertical element 34a is also connected with two diagonals 40a and 40b in the upper deck 76a. Two diagonal elements 40b and 40c and a vertical element 34b are connected to the aft node 254. Each of the two diagonal elements 40b and 40c is continued above the upper deck 76a by two diagonal elements 248.

The wing box 240 may be connected to the upper fuselage structure 54 at fuselage nodes as shown in FIGS. 17-20. Parts of the fuselage structure 54 are omitted for clarity. These connections are similar on the forward side 272 and aft side 274 of the wing box 240 and are transversely symmetrical. It should be noted that in various implementations, the wing 240 is connected with the fuselage structure 54 only at fuselage nodes. Such node connections are in contrast to many existing wing-fuselage connections which are continuous along the active skin of a semi-monocoque fuselage. It also should be noted that, in various implementations, a pressure vessel (e.g., cockpit) of the fuselage does not need to be sealed by the wing 240.

Figure 18:
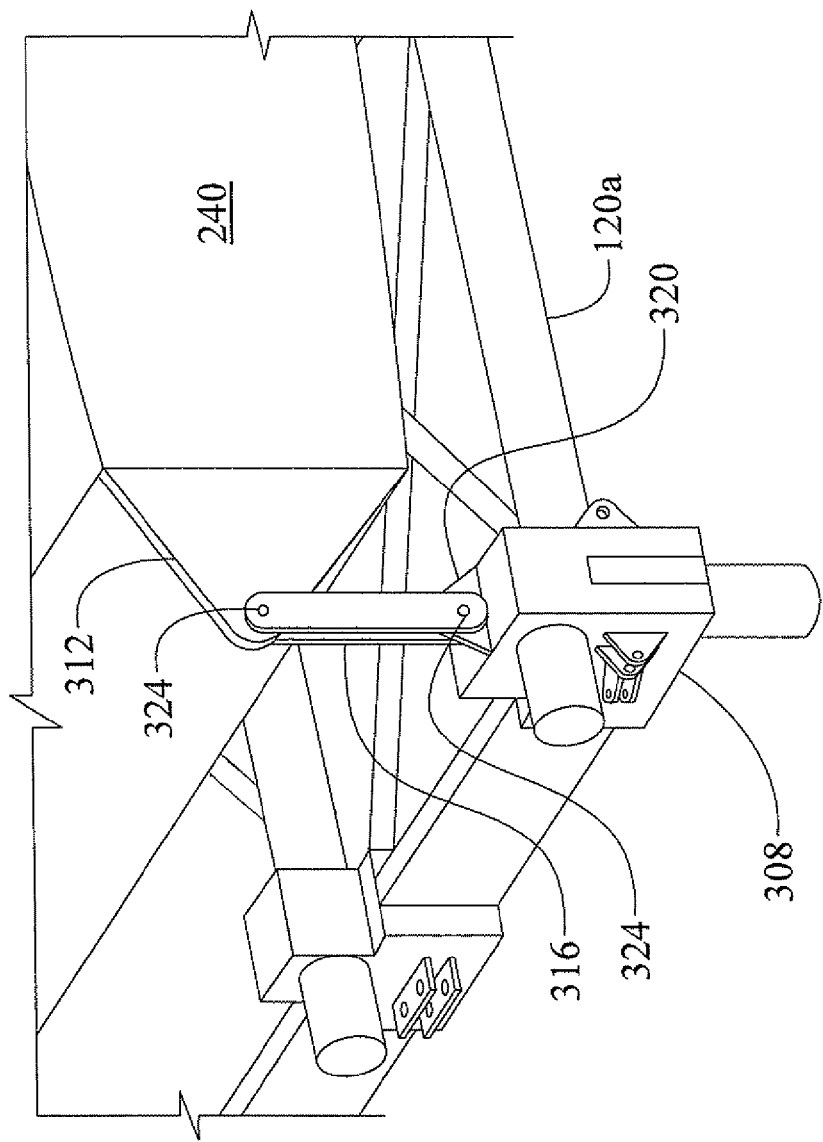
FIG. 18 is a partial perspective view of portions of an upper fuselage structure connected with a wing box in accordance with one implementation of the disclosure, the view taken from the front and left of the structure.

FIG. 18 illustrates one of four nodes 308 connecting the center wing box 240 to the outer longitudinal fuselage trusses 120a. A triangular element 312 extends from the wing box 240. Two oval links 316 connect the wing box extension 312 to a fitting 320 on the space frame node 308. The wing box extension 312 and the node fitting 320 both have spherical bearings 324. The bearings 324 permit the links 316 to rotate about lateral, longitudinal, and/or vertical axes to account for relative movement between the wing box 240 and the fuselage structure 54. The links 316 prevent, however, any relative vertical movement between the wing box extension 312 and the space frame node 308.

Figure 19:
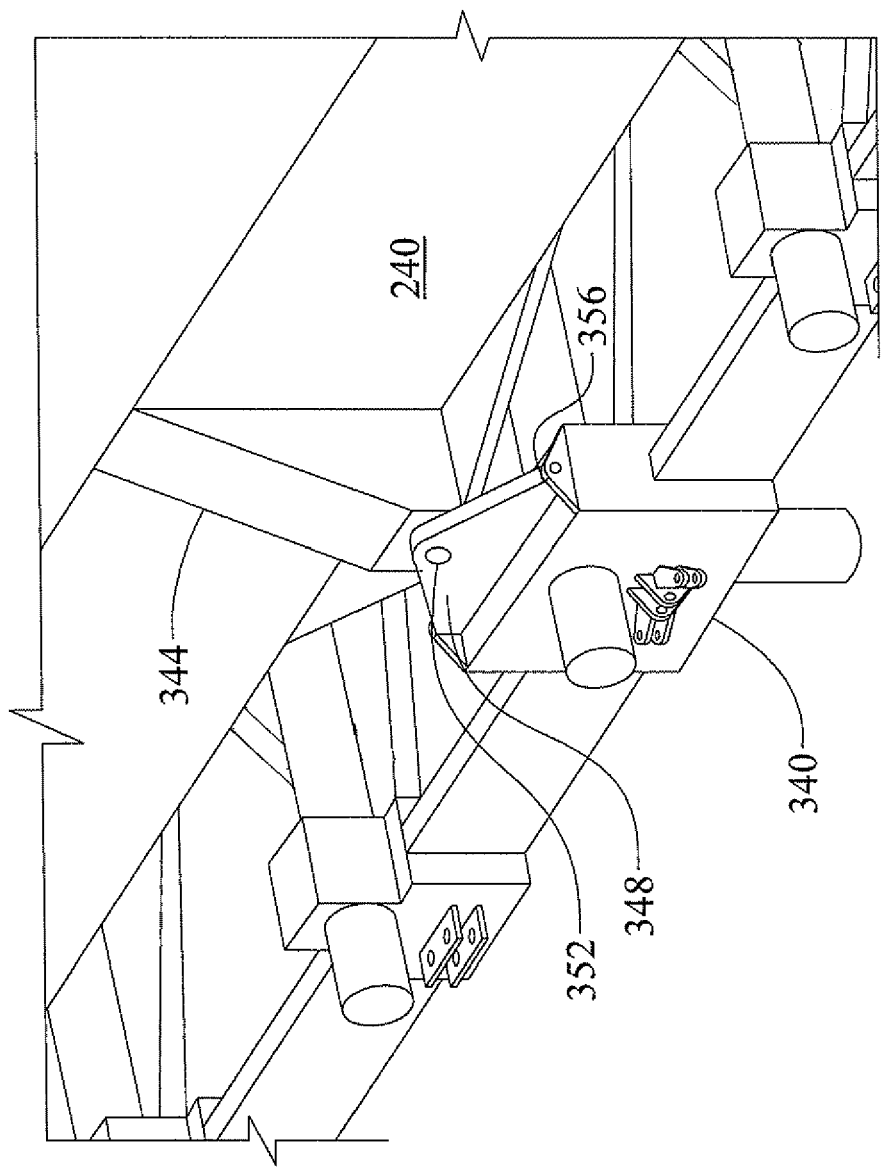
FIG. 19 is a partial perspective view of portions of an upper fuselage structure connected with a wing box in accordance with one implementation of the disclosure, the view taken from the front and left of the structure.

FIG. 19 illustrates one of two nodes 340 connecting the center forward wing box 240 to the central longitudinal truss 120b of the fuselage. A triangular fitting 344 extends the wing box 240 structure toward a triangular fitting 348 extending from the central node 340. The fitting 348 links the wing box extension 344 to the central node 340 via a spherical bearing 352 in the triangular fitting 348. The bearing 352 allows rotation about longitudinal and/or lateral axes. The triangular link 348 is spaced from the triangular fitting 344 by a projection of the spherical bearing 352 so that the link 348 can rotate freely about a lateral axis. The triangular node fitting 348 is connected to fittings 356 on the central node 340 that allow rotation of the link 348 about a lateral axis. Thus the center of the wing box 240 can be restrained relative to the fuselage structure 54 in the vertical and lateral directions.

Figure 17:
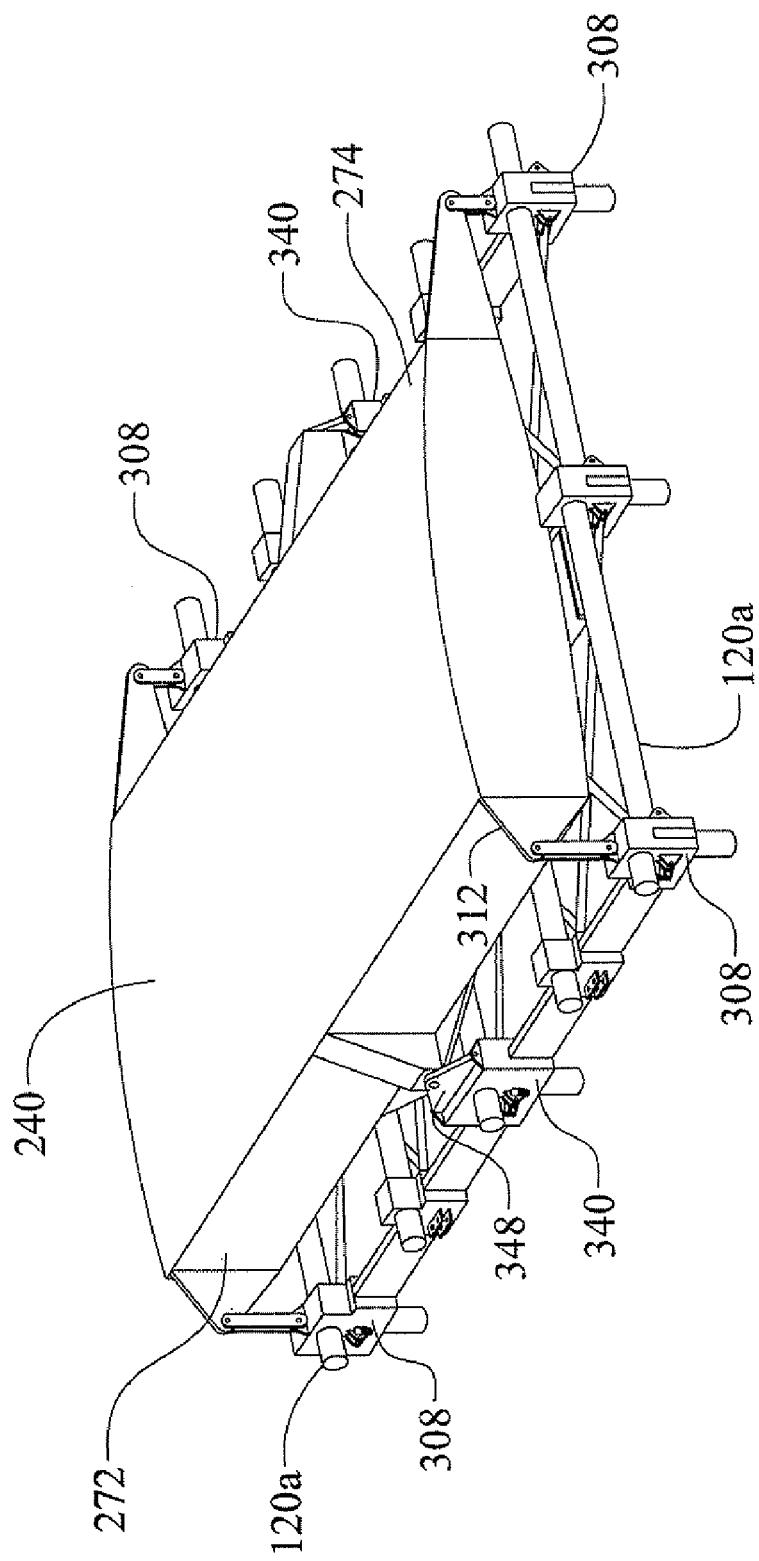
FIG. 17 is a partial perspective view of portions of an upper fuselage structure connected with a wing box in accordance with one implementation of the disclosure, the view taken from the front and left of the structure.

Referring to FIGS. 17-19, vertical loads may be imposed at six points: through the four outboard nodes 308 into the outboard longitudinal trusses 120a immediately ahead of and behind the wing box 240, and at central fuselage longitudinal truss 120b node points 340 immediately ahead of and behind the wing box 240. Lateral loads may be transferred at the two central nodes 340 ahead and behind the wing box 240 as shown in FIGS. 17 and 19.

Figure 20:
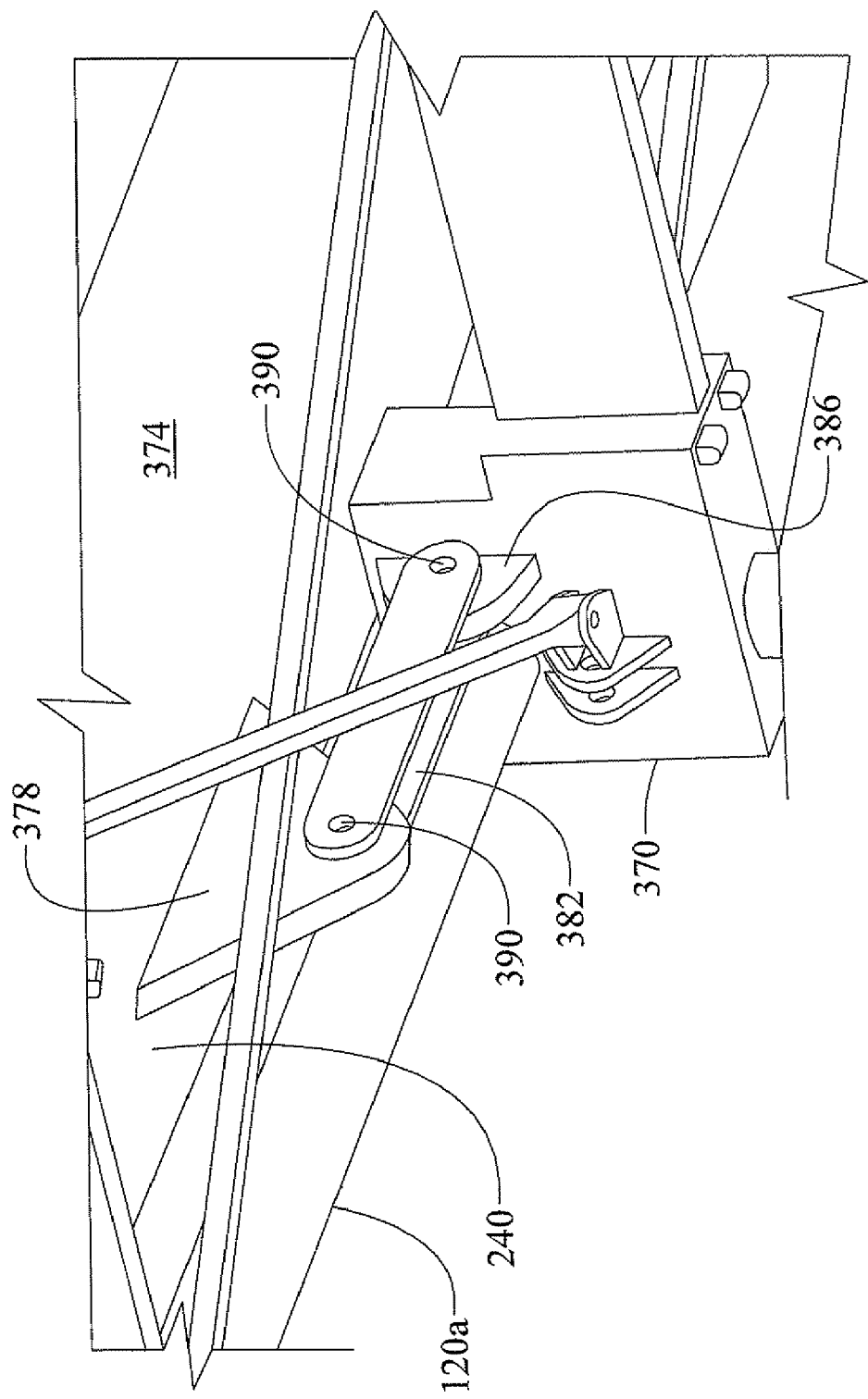
FIG. 20 is a perspective view of a starboard outboard fuselage node at a longitudinal center of a wing box in accordance with one implementation of the disclosure, the view taken looking up, aft, and to the right.

FIG. 20 is a view, taken looking up, aft and to the right of the aircraft 44, of one of two outboard fuselage nodes 370 at the longitudinal center 374 of the wing box 240. A triangular element 378 extends downwardly from the wing box 240. Two oval links 382 connect the wing box extension 378 to a fitting 386 on the space frame node 370. The wing box extension 378 and the node fitting 386 both have spherical bearings 390. The links 382 may be similar to the vertical links 316 shown in FIG. 18. The links 382, however, provide for longitudinal fixity while permitting vertical and lateral motion. Thus longitudinal loads may be transferred to the two outboard nodes 370.

Lateral location of the wing is provided by the two central links 348. Any relative change in lateral dimension between the wing box 240 and fuselage may be accommodated by a change in angle of the four links 316 and of the two mid-outboard links 382. Longitudinal location of the wing is provided by the two mid-outboard links 382. Any relative change in longitudinal dimension between the wing box 240 and fuselage may be accommodated by a change in angle of the two central links 348 and the four outboard links 316.

Redundant load paths may be provided for vertical, lateral, longitudinal, pitch, roll and/or yaw loading between the wing and fuselage. Six links, e.g., central links 348 and outboard links 316, may transfer vertical loads. A failure in any one link 348 or 316 may be compensated by a redistribution of the load among the remaining five links. Two links, e.g., the central links 348, may transfer lateral loads. A failure in one of the links 348 may result in the transfer of lateral load to the remaining central link 348. A resulting yaw moment may be resolved by the two mid-outboard links 382.

Two links, e.g., the two mid-outboard links 382, may transfer longitudinal loads. A failure of one of the links 382 may result in the transfer of longitudinal load through the remaining mid-outboard link 382. A resulting yaw moment may be resolved by the two central links 348. Pitching moments may be resolved by differences in loading between the forward three vertical links (e.g., two outboard links 316 and one central link 348) and the aft three vertical links (e.g., two outboard links 316 and one central link 348). A failure in any one of the links may result in a redistribution of the loads among the remaining five links.

Roll moments may be resolved by differences in loading between the two left outboard links 316 and the two right outboard links 316. A failure of one of these links may be accommodated by a redistribution of the load among the remaining three links as well as the two central links 348. Yaw moments may be resolved by the two central links 348 and the mid-outboard links 382. A failure in one of these links may result in a redistribution of the loads into the remaining three links 348 and/or 382.

In addition to the foregoing redundant paths, it is possible to incorporate a measure of redundancy in some or all of the links. For example, the outboard links 316 and mid-outboard links 382 are shown in FIGS. 18-20 as having two separate links for an additional degree of redundancy. Those skilled in the art know of other or additional methods of increasing redundancy in a link system. It also should be noted that although specific numbers of links have been described above in connection with various types of loading, embodiments also are possible which include different numbers and/or locations of links.

The left-hand wing strut-to-fuselage connection nodes 252 and 254 are shown in greater detail in FIG. 21. Fittings 404 are extensions of the structure of the strut 48. Fittings 408 and 412 are extensions of the lateral elements 32 and nodes 252 and 254, respectively. Fittings 404 extend from the strut structure 48 to engage fittings 408 and 412 on the fuselage structure 54.

Figure 22:
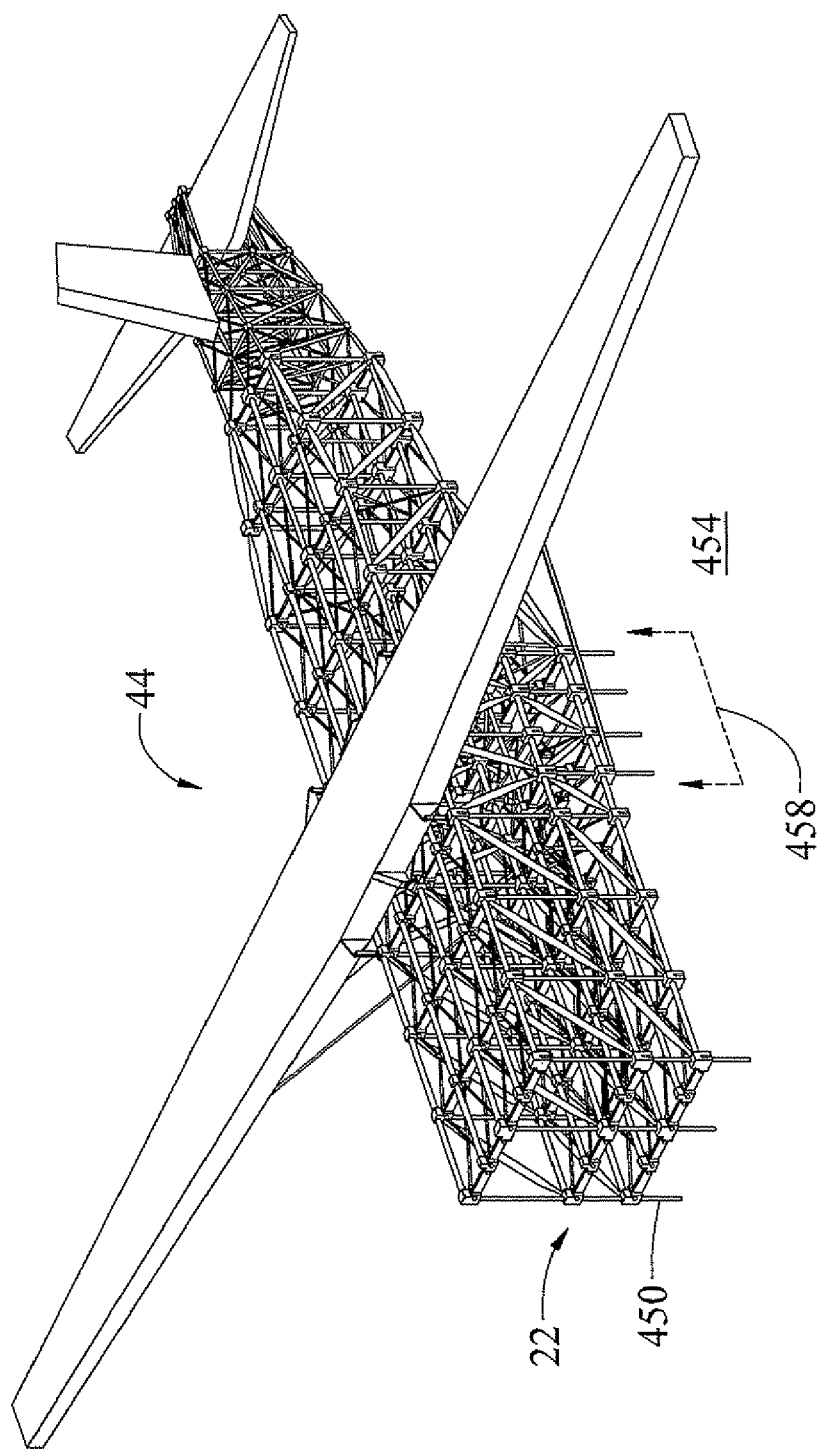
FIG. 22 is a perspective view of portions of an aircraft having a fuselage space frame supported by stabilizing jacks in accordance with one implementation of the disclosure, the view taken from the left side.

In some implementations, stabilizing jacks may be provided, e.g., as shown in FIG. 22. A plurality of jacks 450 may be extended, e.g., from pavement 454 underlying the aircraft 44, to engage the lower forward fuselage 22 at predetermined nodes 36 in accordance with the center of gravity of the aircraft 44 during a loading process. Three longitudinal lines 458 of jacks 450 also may be used, e.g., in alignment with the three longitudinal trusses 120*a* and 120*b*.

Other or additional connections between the fuselage structure 20 and components of the aircraft 44 include, e.g., connections of the fuselage 20 to the horizontal tail 94, vertical tail 92, crew compartment (not shown), landing gear (not shown), cargo door (not shown) and cargo door actuator (not shown). Such connections may be made in various ways. For example, a connection could be made directly to one or more fuselage nodes 36. Additionally or alternatively, a sub-frame could be used to serve as an interface between a component and a plurality of fuselage nodes 36. Another option would be to replace one or more portions of the space frame 20 with more conventional skin-stringer-frame construction. One portion in which such replacement could be performed is in the lateral bays 244 housing the landing gear. Vertical-lateral planes 150 of the lateral bays 244 may be suitable for conventional construction, e.g., in order to provide irregular connection points consistent with the geometric demands of the landing gear.

Cargo containers may be loaded and/or unloaded relative to the fuselage structure 20 on one or more support pallets. A support pallet is preferably sufficiently strong and rigid to span from one node 36 to the next. Configurations of structures for supporting and lifting cargo containers are described in co-pending U.S. patent application Ser. No. 11/190,675 entitled "Cargo Container Handling System and Associated Method," filed Jul. 27, 2005, the disclosure of which is incorporated herein by reference. In various implementations of the present disclosure, actuators and/or other lift mechanisms are provided in the pallets whereby a container 68 may be raised in a bay 72 to secure the container as further described below. Support pallets are longer than one container and could be as long as an entire column of containers.

As previously discussed, at least some nodes 36 are configured to facilitate loading and/or unloading of cargo relative to the cargo hold 56. One such node, e.g., the node 102 in the center of the upper deck 76*a*, is shown in greater detail in FIG. 23. The node 102 may be fastened to up to eight containers 68, although, as previously mentioned, other nodes could provide fastening arrangements for fewer than eight containers. The node 102 includes four restraining pins 504 near the top 508 of the node, two of which are visible in FIG. 23. Each of the restraining pins 504 is configured to laterally engage a lower corner fitting 98 of a container 68 on the upper deck 76*a*. Four pins 512 are provided at the bottom 516 of the node 102. Each of the pins 512 is configured to engage an upper corner fitting 98 of a container 68 on the lower deck 76*b* from above. Four flanged wheels 520 having flanges 524 are provided to support one or more pallets being rolled longitudinally into and/or out of the aircraft 44. The flanges 524 can provide lateral guidance to the pallets as they are moved. In some configurations, flanging may not be provided.

In some implementations, the disclosure is directed to a method of loading and/or unloading cargo relative to the space frame structure 20. A pallet may be rolled across wheels 520 on successive nodes 36 until one or more containers 68 supported by the pallet have reached their destination in the cargo hold 56, e.g., adjacent to and in longitudinal and lateral alignment with nodes 36 to which the container corners are to be fastened. Because the wheels 520 are located at the nodes 36, loading forces are placed directly into the existing structure. A mechanism in the pallet may be activated to raise the container(s) toward the restraining pins 504 and 512, which may be extended to engage the container corners. The pallet mechanism may be lowered clear of the container(s) 68 and the pallet may be removed, leaving the container(s) restrained in the fuselage.

It should be noted that the lower restraining pins 512 do not have to be actively extended. If, for example, a frame accommodates 20 foot containers 68 exclusively such that a container fitting 98 is always present at a node 36, then the lower restraining pins 512 could be fixed. In such case, the pins 512 may engage the container fitting as the container is raised. Alternatively and for example, where some containers span across a node (such as at the middle of a 40-ft container), the lower restraining pins 512 could be spring-loaded to the extended position. In such manner, the pins 512 would engage a raised container fitting or could be raised out of the way by a container middle structure (not the fitting).

Various embodiments of the present fuselage structure can provide strong, rigid inter-linkage among various major components of an aircraft. The fuselage structure is designed to resolve various external and internal loads on the fuselage.

Figure 7:
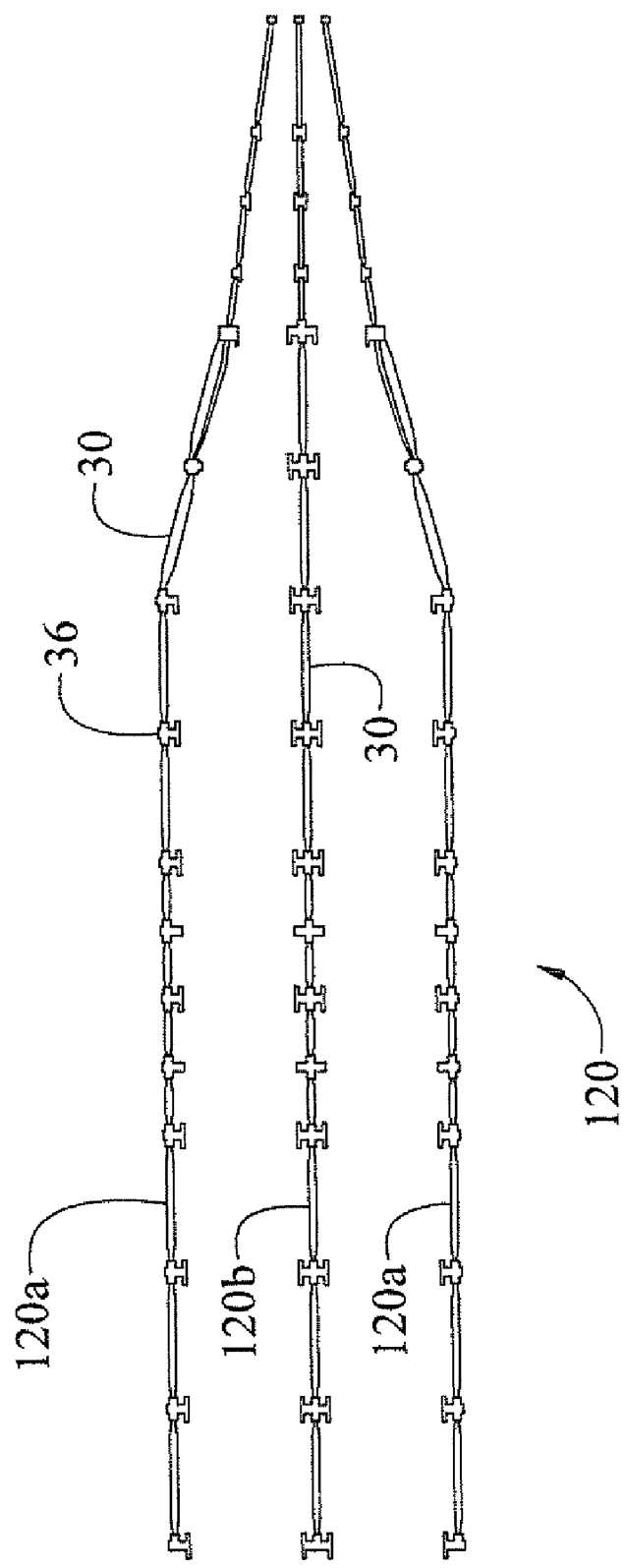
FIG. 7 is a top view of the load-carrying vertical-longitudinal trusses shown in FIG. 5.

Vertical loads from the wings 52, landing gear, horizontal stabilizer 94, wing struts 48, stabilizer jacks 450, containers 68, and so on are resolved by longitudinal trusses 120, e.g., as shown in FIGS. 5, 6 and 7. Longitudinal trusses 120 can resolve loads into nearly pure tension and compression in longitudinal elements 30 (carrying the bending moment) and also in tension and compression in vertical elements 34 and diagonal elements 40 (taking the shear loads). Vertical loads imposed directly on intermediate longitudinal planes 124 (shown in FIGS. 8 and 9) are distributed laterally to longitudinal trusses 120 by lateral elements 32.

Figure 12:
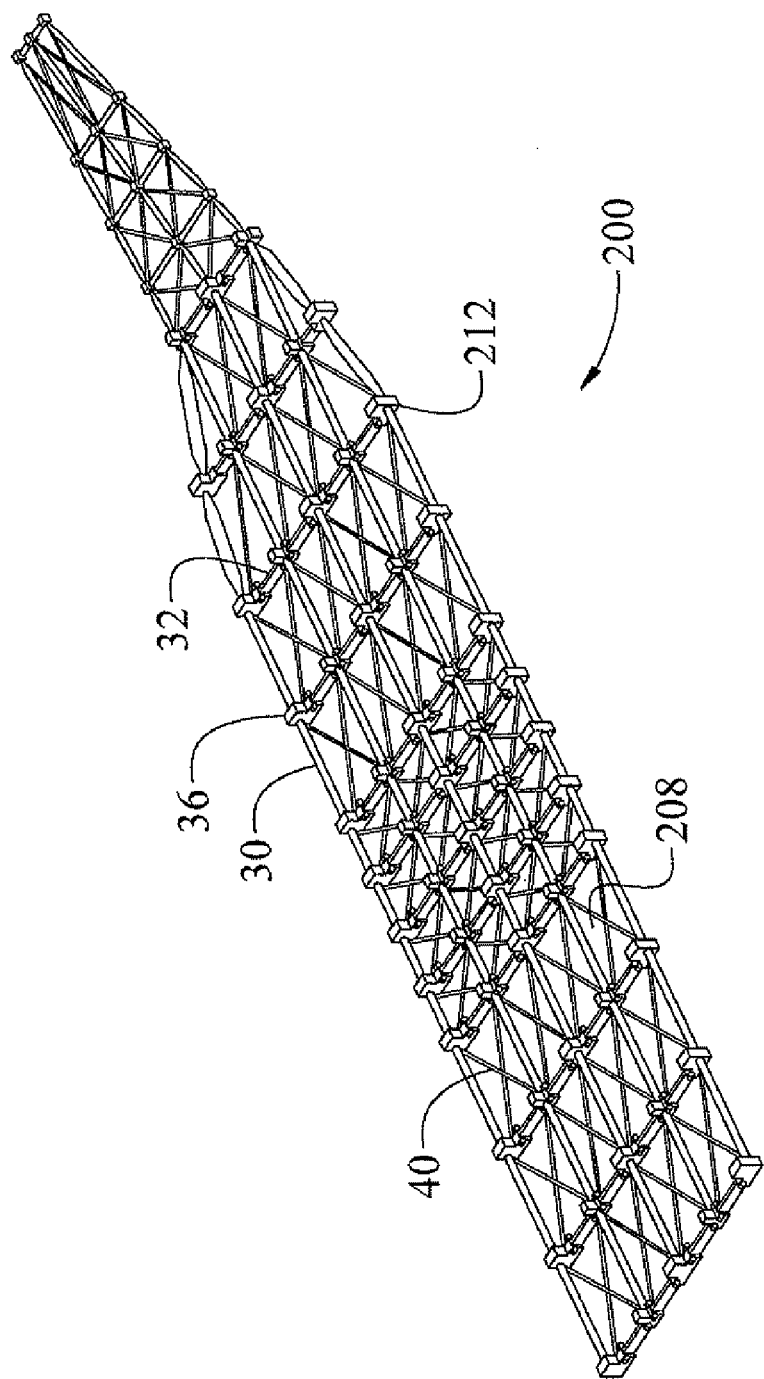
FIG. 12 is a perspective view of a horizontal truss in accordance with one implementation of the disclosure, the view taken from the front and left of the plane.

Longitudinal loads from the wings 52 may enter into outboard longitudinal trusses 120a as illustrated in FIG. 20. Elements of the space frame structure 20 may distribute such loads throughout the longitudinal trusses 120a. From there, such loads may move laterally through horizontal trusses 200 of the structure as illustrated in FIG. 12.

Yawing of the wing box 240 is distributed to the upper horizontal truss 200a. Yaw of the upper horizontal truss 200a can tend to twist the fuselage 20 about a vertical axis so that the cross section of the fuselage tends toward becoming a parallelogram. Such twisting is resisted by the cross bracing 40 in the aft fuselage 60 as illustrated in FIG. 11. It is also resisted by triangulation formed by the wing strut 48, fuselage 20 side and wing box 240. It can also be resisted by a structural nose cargo door and/or by the moment capacity of horizontal elements 30 and 32, vertical elements 40, and nodes 36. These elements also resist lateral loads on the fuselage arising from the wing or landing gear. Pitch loads from the wing 52 in the vertical plane may be resolved by longitudinal trusses 200.

Lateral loads from the vertical stabilizer 92 can be much the same as yaw loads imposed by the wing 52 with an additional component of torsion provided by the vertical stabilizer's vertical offset. This torsional component can be primarily resolved by the shear capacity of the outer surface of the space frame 20, i.e., upper and lower horizontal trusses 200a and 200c and outboard longitudinal trusses 120a. Crash loads may impose substantial inertial loads on cargo. In the horizontal plane, such forces may be resolved by horizontal trusses 200. In the vertical direction, loads may be handled by longitudinal trusses 120.

It can be highly advantageous in various implementations of the present space frame 20 that longitudinal elements 30, lateral elements 32, vertical elements 34, and diagonal elements 40 of the space frame do not all intersect at focused points. As a result, and as previously discussed, the three orthogonal axes of the space frame 20 generally carry moment to stabilize a node 36. In some configurations, in the aft fuselage 60 behind the cargo hold 56, only lateral and vertical elements 32 and 34 carry moment. Furthermore, pins 504 and 512 that engage the cargo containers 68 are also offset from the center of a node 36, imposing further moment on the frame elements.

Figure 23:
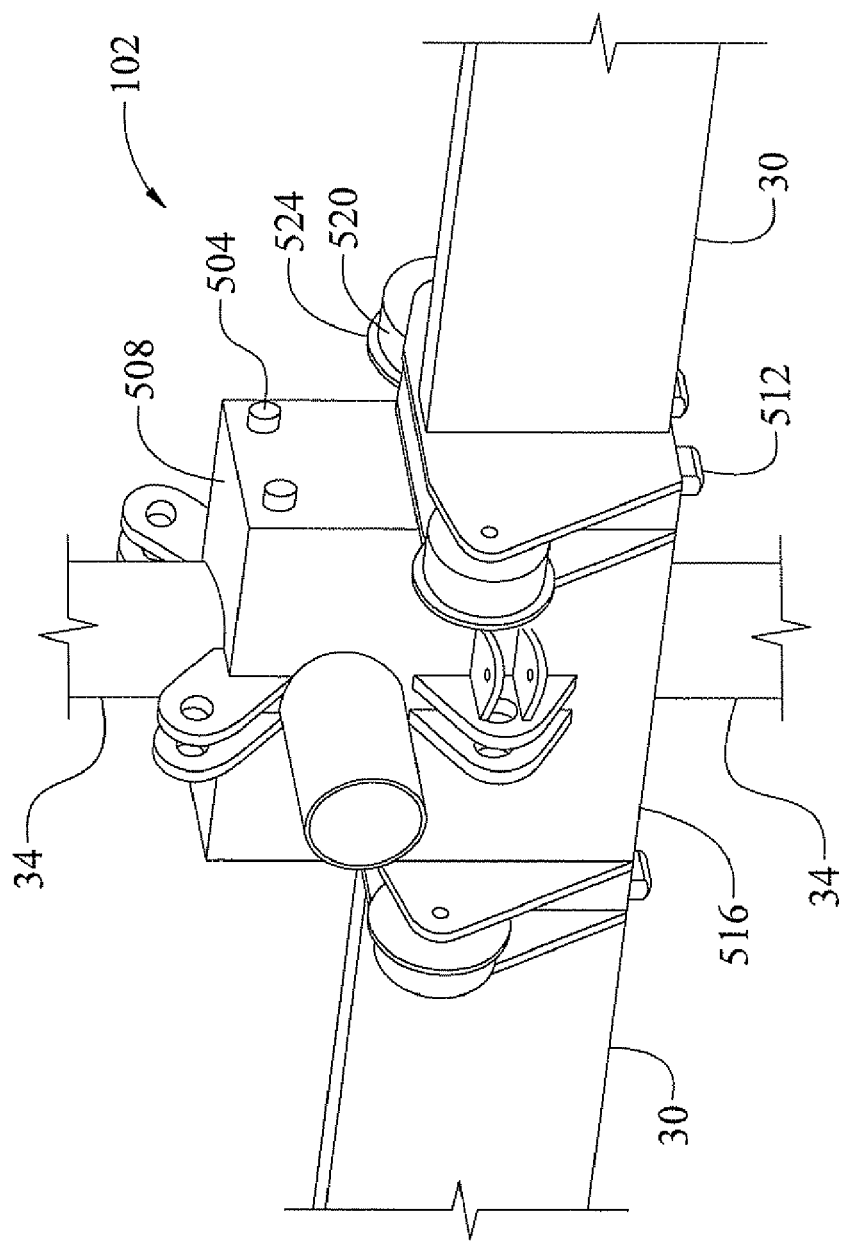
FIG. 23 is a perspective view of a node in accordance with one implementation of the disclosure.

Restraining pins 504 and 512 illustrated in FIG. 23 engage cargo container corner fittings 98. The lower fittings 98 are supported vertically and longitudinally by the pins 504. Lateral support is provided by direct contact with the node 36 surface (on the compression side only). Upper container corner fittings 98 are supported by the pins 512 laterally and longitudinally. Vertical restraint may be provided by the upper nodes 36 in the upward direction only. Flanged wheels 520 support and guide a support pallet as it moves into and out of the aircraft 44. Because a pallet is not carried during flight, its weight is not critical. Accordingly, a pallet can be very strong and rigid and can span from one wheel 520 to the next wheel 520 in the cargo hold 56, thereby obviating any need for additional wheels or rollers.

Resistance to structural failure that might result from failure of a single element is provided by redundancy in the space frame arrangement. For vertical loads, a plurality of longitudinal trusses 120 (e.g., the three trusses shown in FIGS. 5-7) are redundant. A failure in any one of the trusses 120 can be temporarily absorbed by an increased load in other truss(es) 120. Furthermore, in much of the fuselage 20, longitudinal trusses 120 provide in essence a double-truss with an upper, middle and lower chord connected by an upper and lower web. A failure in one of these elements may result in the load finding another path. Similarly, in much of the fuselage a plurality of (e.g., three) substantially horizontal planes of structure are provided. A failure in any one would tend to distribute loads, e.g., to the other two. Several mechanisms may prevent the fuselage cross section from becoming a parallelogram when side-loaded. Such mechanisms may include, e.g., two aft fuselage braced frames 150c, two diagonal wing struts 48, and moment capacity of node joints and frame elements.

Various implementations of the disclosure make it possible to provide structural systems composed essentially of simple elements with minimal numbers of stabilizing elements. Generally, tubular columns in pure axial compression have two potential failure modes: buckling and crippling. Such a structural element may be designed to avoid both failure modes at a specified stress level. It can be shown that it is possible to design a simple tube to just meet buckling and crippling criteria at a single specified stress level σ when the load on the tube meets or exceeds a certain value P. The minimum value P can be derived as follows.

The load Pc at which a column buckles is defined by:

$$Pc = C*E*I*\pi^2/L^2 \quad (1)$$

where C represents end fixity, i.e., a non-dimensional factor pertaining to the end condition, Pc represents the critical buckling load in pounds, E represents the material modulus of elasticity in pounds per square inch, I represents the moment of inertia in inches$^4$ and L represents the tube length in inches.

Moment of inertia is determined by tube radius and wall thickness according to the well-known equation for thin wall tubes:

$$I = \pi*R^3*t \quad (2)$$

Where R represents the tube radius in inches and t represents the tubing wall thickness in inches.

Cross sectional area for the tube varies according to:

$$A = 2*\pi*R*t \quad (3)$$

where A represents the tube cross sectional area in square inches. By substituting the expression for I from equation (2) into equation (1) and dividing by equation (3), the following equation results:

$$Pc/A = C*E*\pi^2*R^2/(2*L^2) \quad (4)$$

where Pc/A represents the material stress in pounds per square inch. Solving equation (4) for R gives the following:

$$R = ((2*Pc/A*L^2)/(C*\pi*E))^{0.5} \quad (5)$$

Since Pc/A is the stress in the tube and is a specified value, it may be noted that the minimum radius R of the tube is independent of the load Pc on the tube and is proportional to length squared, L$^2$.

The structure may also resist a second type of instability, i.e., "crippling". Crippling is a localized unstable deformation that occurs in circular cross section tubes according to the following approximate equation:

$$P/A = 0.605*E*t/R \quad (6)$$

where P/A represents the critical stress at which crippling occurs in pounds per square inch. It can be observed from equation (6) that crippling stress P/A increases with increasing wall thickness t and decreasing tube radius R.

By setting equations (4) and (6) equal, one can obtain the relationship that is obtained when critical buckling and crippling stresses are equal:

$$t = 0.826 * R^3 * C * \pi^2 / L^2 \quad (7)$$

Where σ is used to represent the stress in the component at the coincident buckling and crippling limit:

$$\sigma = P/A \quad (8)$$

Equation 8 may be rearranged to obtain:

$$P = \sigma * A \quad (9)$$

Substituting the expression for A from equation (3) into equation (9) obtains the following:

$$P = 2 * \pi * R * t * \sigma \quad (10)$$

Substituting the expression for t from equation (7) into equation (10) obtains the following:

$$P = 1.652 * \pi^3 * \sigma * C * R^4 / L^2 \quad (11)$$

Substituting the expression for R from equation (5) into equation (11) obtains:

$$P = (6.608 * \sigma^3 * L^2) / (\pi * C * E^2) \quad (12)$$

where P represents the minimum load (in pounds) that permits a buckle and cripple-free un-stiffened tube at the specified stress σ.

Inspection of equation (12) shows that there is a minimum load for a simple tube of a specified length and end condition to achieve a specified stress level and be stable for buckling and crippling. A lesser load would result in a tube that is too thin, that cripples before the specified stress level is reached. Alternatively, the diameter can be reduced to increase the wall thickness, but such a tube would buckle before the desired stress level is reached. More load results in a greater wall thickness, giving greater crippling resistance while still meeting the buckling criterion specified in equation (1).

In structures where a minimum load P as discussed with reference to equation (12) is not reached, the structure is typically stabilized with additional structural elements. These may provide stabilization against buckling, permitting a smaller radius and a thicker, cripple-resistant skin. Alternatively, stabilizing elements may address crippling. Such stabilizing elements tend to add weight, complexity and cost to the structure.

The inventors have observed that structural elements as contemplated in configurations of container-carrying cargo aircraft in accordance with the present disclosure generally have loads that are near to or exceed the minimum level for the lengths involved, according to equation (12). This means that these elements can be made without additional stabilizing elements such as stringers or corrugations that improve crippling resistance but complicate the manufacturing and assembly process.

Although the foregoing discussion refers to circular cross section tubes of constant, thin wall thickness, it can be shown that the same general phenomenon obtains for compression elements of any general form. That is, for a given set of constraints (stress, length, modulus of elasticity and end fixity) it can be shown that there is a minimum load P at which additional stabilizing elements are not required. As a result of the above, most of the elements of the space frame fuselage can be made of unstiffened tubes. This greatly reduces the part count, assembly tooling and assembly cost. Furthermore, because most of the frame elements can be used at or near their stress limits, the structure is lighter than conventional fuselage structure in which much extra structure is needed to stabilize the primary structural elements.

Elements of the space frame 20 can be assembled with little tooling. Longitudinal, lateral and vertical elements can be "plugged into" nodes to obtain a general space frame form and dimensions. Addition of precise-length diagonal elements 40 can determine a precise alignment of the space frame and can render it rigid. Space frame elements can be pre-assembled in relatively compact layers and then joined to a prior layer. For example, a fuselage can be pre-assembled as vertical-lateral planes 150 which can then be joined together first by longitudinal elements 30 and then stabilized by diagonal elements 40. In such manner, a fuselage can be built outwardly from a starting frame 150. Alternatively, the fuselage can be pre-assembled as horizontal trusses 200 which can then be joined together by vertical elements 34. Preferably, all "plug-in" connections are orthogonal and can be made without jamming. Diagonal elements 40 may then be easily placed and pinned.

Individual components of the fuselage, e.g., tubes, beams, tension elements and nodes, are generally very compact. Such elements are typically short in length and compact in other dimensions. Additionally, such components can be packed together efficiently so that transport can be relatively efficient. This contrasts with the transport of typical aircraft structure which tends to be dimensionally bulky and very lightweight. In some implementations, a kit may be provided that includes some or all components for making a space frame fuselage.

Most elements of a space frame can be made by substantially simple tooling. For example, cylindrical tubes can be made with a constant inside diameter so that they plug onto stub tubes that project from the nodes. In such case, key dimensions of the tube with respect to assembly would be inside diameter and length, both of which are relatively easy to make accurately. The outside diameter of a tube is not critical from an assembly standpoint and can be varied (by varying wall thickness) to account for different loads at different points on the tube and/or to optimize for resistance to buckling.

Many elements of the space frame structure can be made with dimensional precision. For example, many of the elements can be made to a precise length as noted above. This permits assembly of the structure without laborious trimming, shimming or adjustment of the parts. There are far fewer parts in various configurations of the present space frame assembly than in a typical semi-monocoque fuselage of equivalent size. This is a result of un-stiffened parts and far fewer connections and fasteners.

In general, diagonal elements 40 of vertical-longitudinal trusses 120 may be arranged so that they experience tension when stressed by a positive pull-up maneuver. Such a maneuver puts greater loads on such trusses than the opposite negative push-over maneuver according to certification requirements. In such manner, the greatest load on the diagonal elements 40 would be in tension, where buckling and crippling are not an issue. This permits a smaller diameter cross-section for a diagonal element 40 and provides a diagonal element 40 with a greater margin against structural crippling. In the same positive pull-up maneuver, vertical elements 34 may be compressed. Vertical elements 34, however, are typically considerably shorter than diagonal elements 40, so buckling is less of an issue. Thus, longer diagonal elements 40 see their greatest loads in tension. Shorter vertical elements 34 see their greatest loads in compression but are less susceptible to buckling because they are shorter. Additionally, the moment connection of a vertical element 34 to a space frame node 36 tends to provide a degree of end fixity that reduces any tendency of the vertical element 34 to buckle.

As previously discussed, a single diagonal element 40 may be used in a rectangular cell to provide shear transfer, e.g., as previously discussed with reference to vertical-longitudinal trusses 120 (shown in FIGS. 5-7). Alternatively, two diagonal elements 40, forming an "X", may be used in a cell, e.g., as shown in FIG. 12. Choices of bracing types and materials may be influenced by various factors. Materials that would operate in compression (such as aluminum and carbon fiber reinforced plastics) tend to have substantially lower stress allowables than materials that operate only in tension (e.g., aramid fibers such as Dupont Kevlar or Tejin Technora) while elastic moduli are similar. Rigidity, weight and/or cost could also influence a choice between single-element bracing and X-bracing.

The foregoing fuselage structure can have compact dimensions and can be lighter and less expensive compared to conventional semi-monocoque fuselages, resulting in an airplane for which costs of cargo transport are lower relative to transport costs for other airplane types. Various nodes of the fuselage structure can be located at, and can interconnect, various concentrated loads of the airplane, including, e.g., a crew station (cockpit), wings, landing gear, tails, cargo containers, cargo door, external jacks and wing struts. The foregoing fuselage structure can provide sufficient strength and rigidity under various flight, landing, taxi and crash loads.

The systems and methods of the present disclosure make it possible for transporting cargo by aircraft at reduced costs, through the use of inter-modal containers that can be loaded at the origin, carried on surface vehicles, carried on airplanes and delivered to the destination via surface transport, all without intermediate handling of the cargo within the containers. Most existing cargo airplanes are derived from passenger airplanes and/or may be required at times to carry passengers. As a result, almost all existing cargo airplanes have pressurized cargo holds so that passengers may breathe effectively at high cruise altitudes. Where a new, pure-cargo aircraft is provided that includes a configuration of the foregoing space frame structure, a significant constraint for fuselage structure, i.e., a pressurized cargo hold, is removed.

In various implementations, cargo containers can be connected to the fuselage at only a few discrete points. No connections need to be made between a container and the fuselage structure other than the previously described connections with the fuselage structure at corner fittings of the container. Compared to conventional aircraft fuselages, the foregoing fuselage structure has less and lighter structure dedicated to stabilizing the structure against buckling, crippling and crushing from in-service loads. The fuselage structure can be inexpensive to make as a result of reduced need for trimming of parts during assembly, reduced need for dimensional accuracy of parts, reduced need for tooling for part manufacture and assembly, simple manufacturing processes for components, reduced component size for ease of transportation, and reduced number of parts.

An aircraft having the foregoing fuselage structure can be jacked for cargo loading and unloading operations. The fuselage structure makes it possible for jack points of the fuselage to accept very large, concentrated loads. Various implementations of the disclosure facilitate rapid loading and unloading of cargo, including rapid restraint of the cargo. It should be noted that the present fuselage structure can support the cargo as it is loaded and unloaded.

Various configurations provide structural redundancy in the event of a partial structural failure. The strength of the fuselage can be increased or decreased with little change to the overall form or dimensions of the fuselage. Strengths of many of the fuselage elements can be easily tailored to the loads on specific elements without changing the general form or tooling for a particular element. The size of the fuselage can be enlarged or reduced incrementally with little change to initial structure. Thus, various implementations of the disclosure can facilitate rapid assembly of a fuselage from simple parts using little tooling. By virtue of the easily tailored strength of the components, it may be desirable to create some areas within the airplane where higher weight payload may be carried. Such a payload may impose extra load on some of the structural elements. These elements can be strengthened with little change to tooling or the overall arrangement of the fuselage structure. Furthermore, this ease of adjustment of component strength may enable a manufacturer to offer specially tailored structures according to individual customer's needs or to offer a wide range of models with relatively little extra development cost. A fuselage structure can be built in which little if any extra structure is required to provide stability against buckling, crippling and/or crushing. Some implementations work well with a strut-braced wing. Simple, lightweight composite and/or metallic parts can be used effectively in the foregoing fuselage structure, and the span of cargo floor beams can be reduced.

Space frame structural concepts of the present disclosure lend themselves to easy replacement of structural components. Replacement can be easy, e.g., because a space frame component typically is connected to only two other components (i.e., to nodes). Thus a damaged component typically can be easily and quickly replaced, thereby reducing the economic loss of keeping an airplane out of service and reducing the cost of the actual repair. Ease of replacement can make it possible to replace certain components with stronger components for an individual flight or series of flights with an unusual or special payload that tends to increase loads in those components. This increases the utility of the airplane while retaining its light weight for typical, less concentrated payloads.

It is a characteristic of various implementations of the space frame fuselage structure that essentially all of the loads flow through space frame linear elements. The number of these elements is small compared to prior art fuselage structures, and the number of connections to each element is small. This means that stresses in each individual component may be obtained from a few sensors. Furthermore, flow of loads throughout the entire fuselage structure, including the nodes, may be easily calculated from such individual stresses due to the discrete load paths of the space frame. This enables the loads on the structure to be easily monitored over time. For example, a system monitoring a space frame fuselage structure may report if any component has been overloaded. Such a report could trigger an inspection or replacement of the component. A monitoring system could provide a report of loads on each component over a lengthy period of time. Such a report could be used to more accurately size each component in future airplanes and/or could lead to the replacement of in-service components that may be too heavily loaded (with stronger components) or may be too lightly loaded (with lighter components).

A monitoring system could report if there is a relative change in the loading of any component, for example, if a damaged component deflects instead of carrying load and sheds load to other, neighboring components. Accordingly, the damaged component could be replaced. Additionally or alternatively, a monitoring system could record load versus time on each component in the event of a crash. Such a report could provide analysts with a very detailed record of structural dynamics during a crash. This could lead to improved designs and can permit a more accurate analytical reconstruction of a crash occurrence.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An aircraft for carrying containerized cargo, the aircraft comprising:
   a space frame forming a fuselage, the space frame including a plurality of nodes, each of the nodes connecting a plurality of elements of the space frame, the space frame enabling at least one structural component of the aircraft to be at least partially supported directly from at least a first one of the nodes of the space frame,
   at least a subplurality of the nodes being selectively positioned in the space frame based on dimensions of a standardized shipping container, and the subplurality of nodes further being secured to predetermined portions of the standardized shipping container to enable the shipping container to be fully supported by the subplurality of nodes;
   wherein the space frame comprises linear elements and wherein the fuselage is configured such that essentially all of the loads flow through the linear elements.

2. The aircraft of claim 1, wherein the fuselage structure is adapted to carry a plurality of the standardized shipping containers, and wherein at least some of the subplurality of nodes are configured to engage a plurality of corner portions of two or more ones of the plurality of standardized shipping containers to restrain the two or more standardized shipping containers.

3. The aircraft of claim 1, wherein at least some of the dimensions of the one or more standardized containers are modular.

4. The aircraft of claim 1, wherein the space frame is configured to resolve loading by the standardized shipping container independent of a skin of the aircraft.

5. The aircraft of claim 1, wherein the space frame comprises a plurality of trusses providing a plurality of redundant load paths in the frame for the standardized shipping container.

6. The aircraft of claim 1, wherein rotation of a given one of the nodes about a given axis is opposed by at least one element connected at the given one of the nodes and substantially orthogonal to the given axis.

7. The aircraft of claim 6, further comprising a plurality of diagonal elements connected to one or more of the nodes.

8. The aircraft of claim 1, wherein at least some of the nodes prevent transfer of a moment to the elements.

9. The aircraft of claim 1, wherein one of the at least some of the nodes restrains more than one said standardized shipping container.

10. The aircraft of claim 1, further comprising a wing connected with one or more of the nodes of the space frame that forms the fuselage structure.

11. An aircraft for carrying containerized cargo, the aircraft comprising:
    a space frame forming a fuselage for the aircraft, the space frame including a plurality of nodes, each of the nodes connecting a plurality of elements to form the space frame, the space frame defining a plurality of rectangular bays for receiving and housing a plurality of standardized shipping containers;
    the plurality of rectangular bays further being arranged in a first group at a first elevation and a second group at a second elevation above the first group;
    the nodes further being positioned to form the space frame based on length and width dimensions of the standardized shipping containers, to enable at least one said standardized shipping container from each of the first and second groups of rectangular bays to be secured to one another, and further such that each of the secured standardized shipping containers is secured at a plurality of corner portions thereof;
    wherein the space frame comprises linear elements and wherein the fuselage is configured such that essentially all of the loads flow through the linear elements.

12. An aircraft for carrying containerized cargo, the aircraft comprising:
    a space frame forming a fuselage structure, the space frame including a plurality of nodes, each of the nodes connecting a plurality of elements to form the space frame in a manner such that the space frame is adapted to carry one or more standardized shipping containers therein;
    at least some of the nodes positioned in the space frame based on length and width dimensions of the one or more standardized shipping containers to enable supporting each of the one or more standardized shipping containers only at one or more corner portions of each one of the one or more standardized shipping containers, and only at the corner portions located at opposing longitudinal ends of each one of the one or more standardized shipping containers;
    wherein the space frame comprises linear elements and wherein the fuselage is configured such that essentially all of the loads flow through the linear elements.

* * * * *